United States Patent
Solovyeva et al.

(10) Patent No.: US 11,846,179 B1
(45) Date of Patent: Dec. 19, 2023

(54) COVALENT ORGANIC FRAMEWORKS AS TRACERS FOR FLUORESCENT UPSTREAM IMAGING

(71) Applicant: Saudi Arabian Oil Company, Dhahran (SA)

(72) Inventors: Vera Solovyeva, Moscow (RU); Nouf M. Jabri, Dammam (SA); Alberto F. Marsala, Venice (IT)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/949,481

(22) Filed: Sep. 21, 2022

(51) Int. Cl.
  *C09K 8/035* (2006.01)
  *E21B 47/11* (2012.01)
  *G01N 21/64* (2006.01)

(52) U.S. Cl.
  CPC .............. *E21B 47/11* (2020.05); *C09K 8/035* (2013.01); *G01N 21/643* (2013.01)

(58) Field of Classification Search
  None
  See application file for complete search history.

(56) References Cited

U.S. PATENT DOCUMENTS

| | | | |
|---|---|---|---|
| 7,937,222 | B2 | 5/2011 | Donadille et al. |
| 8,627,902 | B2 | 1/2014 | Hammer |
| 8,680,866 | B2 | 3/2014 | Marsala et al. |
| 8,812,237 | B2 | 8/2014 | Wilt et al. |
| 9,260,957 | B2 | 2/2016 | Commarieu et al. |
| 9,366,099 | B2 | 6/2016 | Ly |
| 9,405,033 | B2 | 8/2016 | Marsala et al. |
| 9,611,736 | B2 | 4/2017 | Marsala et al. |
| 9,651,700 | B2 | 5/2017 | Marsala et al. |
| 9,696,450 | B2 | 7/2017 | Marsala et al. |
| 9,983,328 | B2 | 5/2018 | Marsala et al. |
| 10,125,586 | B2 | 11/2018 | Balan et al. |
| 10,132,952 | B2 | 11/2018 | Marsala et al. |
| 10,145,975 | B2 | 12/2018 | Marsala et al. |
| 10,156,654 | B2 | 12/2018 | Marsala et al. |
| 10,267,943 | B2 | 4/2019 | Marsala et al. |
| 10,377,938 | B2 | 8/2019 | Sarkar et al. |
| 10,408,045 | B2 | 9/2019 | Cox |
| 10,488,387 | B2 | 11/2019 | Waid |
| 10,570,716 | B2 | 2/2020 | Balan et al. |
| 10,612,360 | B2 | 4/2020 | Al-Qasim et al. |
| 10,677,034 | B2 | 6/2020 | Balan et al. |

(Continued)

FOREIGN PATENT DOCUMENTS

| | | |
|---|---|---|
| CA | 2851237 | 5/2013 |
| GB | 2489714 | 10/2012 |

(Continued)

OTHER PUBLICATIONS

Albacete et al., "Layer-Stacking-Driven Fluorescence in a Two-Dimensional Imine-Linked Covalent Organic Framework," Journal of the American Chemical Society, Sep. 2018, 140(40):12922-12929, 8 pages.

(Continued)

*Primary Examiner* — Andrew Sue-Ako
(74) *Attorney, Agent, or Firm* — Fish & Richardson P.C.

(57) ABSTRACT

This disclosure relates to methods of charactering and analyzing drill cuttings, such as drill cuttings labeled with fluorescent covalent organic framework tracers.

17 Claims, 6 Drawing Sheets

(56) References Cited

U.S. PATENT DOCUMENTS

| | | |
|---|---|---|
| 10,677,035 B2 | 6/2020 | Balan et al. |
| 10,808,529 B2 | 10/2020 | Ow et al. |
| 11,427,742 B2 | 8/2022 | AlJabri et al. |
| 11,473,425 B2 | 10/2022 | AlJabri et al. |
| 2004/0108110 A1 | 6/2004 | Zupanick et al. |
| 2005/0252286 A1 | 11/2005 | Ibrahim et al. |
| 2009/0087911 A1 | 4/2009 | Rogerio |
| 2010/0132448 A1 | 6/2010 | Donadille et al. |
| 2010/0198519 A1 | 8/2010 | Wilt et al. |
| 2012/0062886 A1 | 3/2012 | Piotti et al. |
| 2012/0178653 A1 | 7/2012 | McClung, III |
| 2012/0268135 A1 | 10/2012 | Marsala et al. |
| 2012/0325465 A1 | 12/2012 | Hammer et al. |
| 2014/0203810 A1 | 7/2014 | Marsala et al. |
| 2014/0203811 A1 | 7/2014 | Marsala et al. |
| 2014/0319379 A1 | 10/2014 | Manian |
| 2014/0361777 A1 | 12/2014 | Marsala et al. |
| 2015/0061683 A1 | 3/2015 | Marsala et al. |
| 2015/0061684 A1 | 3/2015 | Marsala et al. |
| 2015/0132543 A1 | 5/2015 | Nouzille et al. |
| 2015/0232748 A1 | 8/2015 | Kanj et al. |
| 2016/0291194 A1 | 10/2016 | Marsala et al. |
| 2017/0059668 A1 | 3/2017 | Chang et al. |
| 2017/0210979 A1* | 7/2017 | Cairns ............. C09K 8/72 |
| 2017/0351000 A1 | 12/2017 | Marsala et al. |
| 2018/0066515 A1 | 3/2018 | Marsala et al. |
| 2018/0171782 A1 | 6/2018 | Cox et al. |
| 2018/0275306 A1 | 9/2018 | Marsala et al. |
| 2018/0298752 A1 | 10/2018 | Balan et al. |
| 2018/0347349 A1 | 12/2018 | Marsala |
| 2019/0003291 A1 | 1/2019 | Balan et al. |
| 2019/0003292 A1 | 1/2019 | Balan et al. |
| 2019/0011593 A1 | 1/2019 | Marsala et al. |
| 2019/0169975 A1 | 6/2019 | Al-Qasim et al. |
| 2019/0194529 A1* | 6/2019 | Han ............. C04B 35/62894 |
| 2019/0368336 A1 | 12/2019 | Hammond et al. |
| 2019/0391034 A1 | 12/2019 | Al Jabri |
| 2020/0030777 A1 | 1/2020 | Al-Jabri et al. |
| 2020/0031738 A1 | 1/2020 | Al-Jabri et al. |
| 2020/0032148 A1 | 1/2020 | Al-Jabri et al. |
| 2020/0116019 A1 | 4/2020 | Ow et al. |
| 2020/0208513 A1 | 7/2020 | Al-Qasim et al. |
| 2020/0408089 A1 | 12/2020 | Ow et al. |
| 2022/0056329 A1 | 2/2022 | Al-Jabri et al. |
| 2022/0306932 A1* | 9/2022 | Al-Qasim ............. C09K 8/594 |
| 2023/0174839 A1* | 6/2023 | Solovyeva ............. C09K 11/06 166/250.12 |

FOREIGN PATENT DOCUMENTS

| | | |
|---|---|---|
| WO | WO 2012115717 | 8/2012 |
| WO | WO 2014051789 | 4/2014 |
| WO | WO 2014060562 | 4/2014 |
| WO | WO 2014207075 | 12/2014 |
| WO | WO 2017136641 | 8/2017 |
| WO | WO 2018085504 | 5/2018 |
| WO | WO 2018234431 | 12/2018 |
| WO | WO 2019212670 | 11/2019 |
| WO | WO 2020019367 | 1/2020 |

OTHER PUBLICATIONS

Allard et al., "Core-shell type dually fluorescent polymer nanoparticles for ratiometric pH-sensing," J. Polym. Sci., Part A: Polym. Chem., 2008, 46(18):6206-6213, 8 pages.

Behnke et al., "Encapsulation of Hydrophobic Dyes in Polystyrene Micro- and Nanoparticles via Swelling Procedures," J. Fluoresc., 2011, 21(3):937-944, 8 pages.

Chuang et al., "Ultra-sensitive in-situ detection of near-infrared persistent luminescent tracer nanoagents in crude oil-water mixtures," Scientific Reports, Jun. 2016, 6(1):27993, 6 pages.

Dalapati et al., "Highly Emissive Covalent Organic Frameworks," Journal of the American Chemical Society, Apr. 2016, 138(18), 5797-5800, 6 pages.

Deschamps et al., "Drilling to the Extreme: the Micro-Coring Bit Concept," IADC/SPE 115187, presented at the IADC/SPE Asia Pacific Drilling Technology Conference and Exhibition, Aug. 25-27, 2008, 12 pages.

Desmette et al., "Drilling Hard and Abrasive Rock Efficiently, or Generating Quality Cuttings? You No. Longer Have to Choose . . . ," SPE 116554, Society of Petroleum Engineers, 2008 SPE Annual Technical Conference and Exhibition, Sep. 21-24, 2008, 19 pages.

Geng et al., "Covalent Organic Frameworks: Design, Synthesis, and Functions," Chemical Reviews, Jan. 2020, 120(16):8814-8933, 120 pages.

Georgi et al., "Advances in Cuttings Collection and Analysis," SPWLA 34th Annual Logging Symposium, Jun. 13-16, 1993, 20 pages.

Musyanovych et al., "Preparation of Biodegradable Polymer Nanoparticles by Miniemulsion Technique and Their Cell Interactions," Macromolecular Bioscience, Feb. 2008, 8(2):127-139, 13 pages.

Poitzsch et al., "Nanoparticle Tags for Improved Depth Correlation," IPTC-19785, International Petroleum Technology Conference (IPTC), IPTC Conference 2020, 2 pages (abstract only).

Rager et al., "Pore wall fluorescence labeling of covalent organic framework," CrystEngComm, May 2017, 19(33), 4886-4891, 6 pages.

Reisch et al., "Fluorescent Polymer Nanoparticles Based on Dyes: Seeking Brighter Tools for Bioimaging," Small, Apr. 2016, 12(15):1968-1992, 48 pages.

Santarelli et al., "Formation Evaluation From Logging on Cuttings," SPE Reservoir Evaluation and Engineering, presented at the 1996 SPE Permian Basin Oil and Gas Recovery Conference, Mar. 27-29, 1996, published Jun. 1998, 7 pages.

Vollrath et al., "Fluorescence imaging of cancer tissue based on metal-free polymeric nanoparticles—a review," J. Mater. Chem. B, Mar. 2013, 1(15):1994-2007, 15 pages.

\* cited by examiner

COVALENT ORGANIC FRAMEWORKS AS TRACERS FOR FLUORESCENT UPSTREAM IMAGING

TECHNICAL FIELD

This document relates to fluorescent covalent organic frameworks. The fluorescent covalent organic frameworks are environmentally friendly and can be used for oil and gas applications, including as tracers for oilfield applications or as tags for drill cuttings labeling.

BACKGROUND

Oil field tracers are used in single wells or between several wells for use in determining the production rate or oil saturation of the formation, to check the connectivity of wells, to determine the quality of insulation of well completion, cementing, or packer's installation, and for other oilfield surveys. The majority of tracers used in oil field operations require labor- and time-consuming sampling and detection protocols that elongate and complicate obtaining and interpreting results from the tracers. Due to these issues, an efficient system for simple and fast detection and monitoring of onsite tracers is highly desirable.

A number of fluorophores have been used in oil well tracing. Among the main drawbacks in classical fluorescent dyes-based tracing is a low level of detection sensitivity that requires the extraction of tags, and in some cases their pre-concentration, followed by instrumental (fluorimeter) analysis. Many of the other fluorophores (for example, fluorescent quantum dots and fluorescent organic complexes) suffer from the same lack of required intensity issues. Recently, persistent luminescence nanoagents were proposed as a step towards automated CCD camera-assisted detection of the tracers. Chuang et al., Sci. Rep. (2016) 6:27993. However, the complicated synthesis of these nanoagents as well as the presence of toxic lanthanides in their core are limiting factors of their broad application. Thus, bright emitting, stabile, eco-friendly fluorescent tracers that could be easily detected on site are desirable.

SUMMARY

Provided in the present disclosure is a method of well logging. In some embodiments, the method includes adding a fluorescent covalent organic framework (COF) tracer to a well while drilling the well; injecting the fluorescent COF tracer into drill cuttings produced while drilling the well, thereby labeling the drill cuttings with the fluorescent COF tracer; pumping the labeled drill cuttings upwards in the well towards an annulus of the well; collecting the labeled drill cuttings; and identifying the fluorescent COF tracer in the drill cuttings.

In some embodiments of the method, the fluorescent COF tracer includes fluorescent building blocks, covalently attached fluorescent moieties, fluorophores loaded into the channels and pores of the COF, or a combination thereof.

In some embodiments of the method, the fluorescent COF tracer is added to the well via a drill string of the well. In some embodiments, the fluorescent COF tracer is injected into the produced drill cuttings by breaking a capsule comprising the fluorescent COF tracer.

In some embodiments of the method, where more than one fluorescent COF tracer is added to the well, each fluorescent COF tracer has a different fluorescent emission wavelength and fluorescent emission spectra.

In some embodiments of the method, the labeled drill cuttings are comprised in a drilling mud. In some embodiments, the drilling mud is pumped upwards by hydraulic circulation.

In some embodiments, the method further includes separating the labeled drill cuttings from the drilling mud after collecting the labeled drill cuttings. In some embodiments, the labeled drill cuttings are collected at a shale shaker.

In some embodiments of the method, the fluorescent COF tracer in the drill cuttings is identified by ultraviolet (UV) light and a camera.

In some embodiments, the method further includes determining a depth associated with the labeled drill cuttings based on the identification of the fluorescent COF tracer.

In some embodiments of the method, the well is an oil well.

Also provided in the present disclosure is a method of determining the depth of drill cuttings in a well. In some embodiments, the method includes obtaining drill cuttings from the well, wherein the drill cuttings are labeled with a fluorescent covalent organic framework (COF) tracer; and identifying the fluorescent COF tracer in the drill cuttings by ultraviolet (UV) light and a camera, wherein the fluorescent COF tracer has a fluorescent emission wavelength and fluorescent emission spectra that allows for determination of the depth associated with the labeled drill cuttings. In some embodiments, the identifying occurs onsite at the well.

In some embodiments of the method, where more than one fluorescent COF tracer is added to the well, each fluorescent COF tracer has a different fluorescent emission wavelength and fluorescent emission spectra.

In some embodiments of the method, the drill cuttings are labeled with the fluorescent COF tracer downhole while drilling the well. In some embodiments, the fluorescent COF tracer is injected into the drill cuttings by breaking a capsule comprising the fluorescent COF tracer.

Also provided in the present disclosure is a composition containing drill cuttings obtained from a drilling well and one or more fluorescent covalent organic framework (COF) tracers attached to the drill cuttings. In some embodiments, the fluorescent COF tracer contains fluorescent building blocks, covalently attached fluorescent moieties, fluorophores loaded into the channels and pores of the COF, or a combination thereof. In some embodiments, the fluorescent COF tracer is detectable by ultraviolet (UV) spectroscopy.

DETAILED DESCRIPTION

Figure 1A:
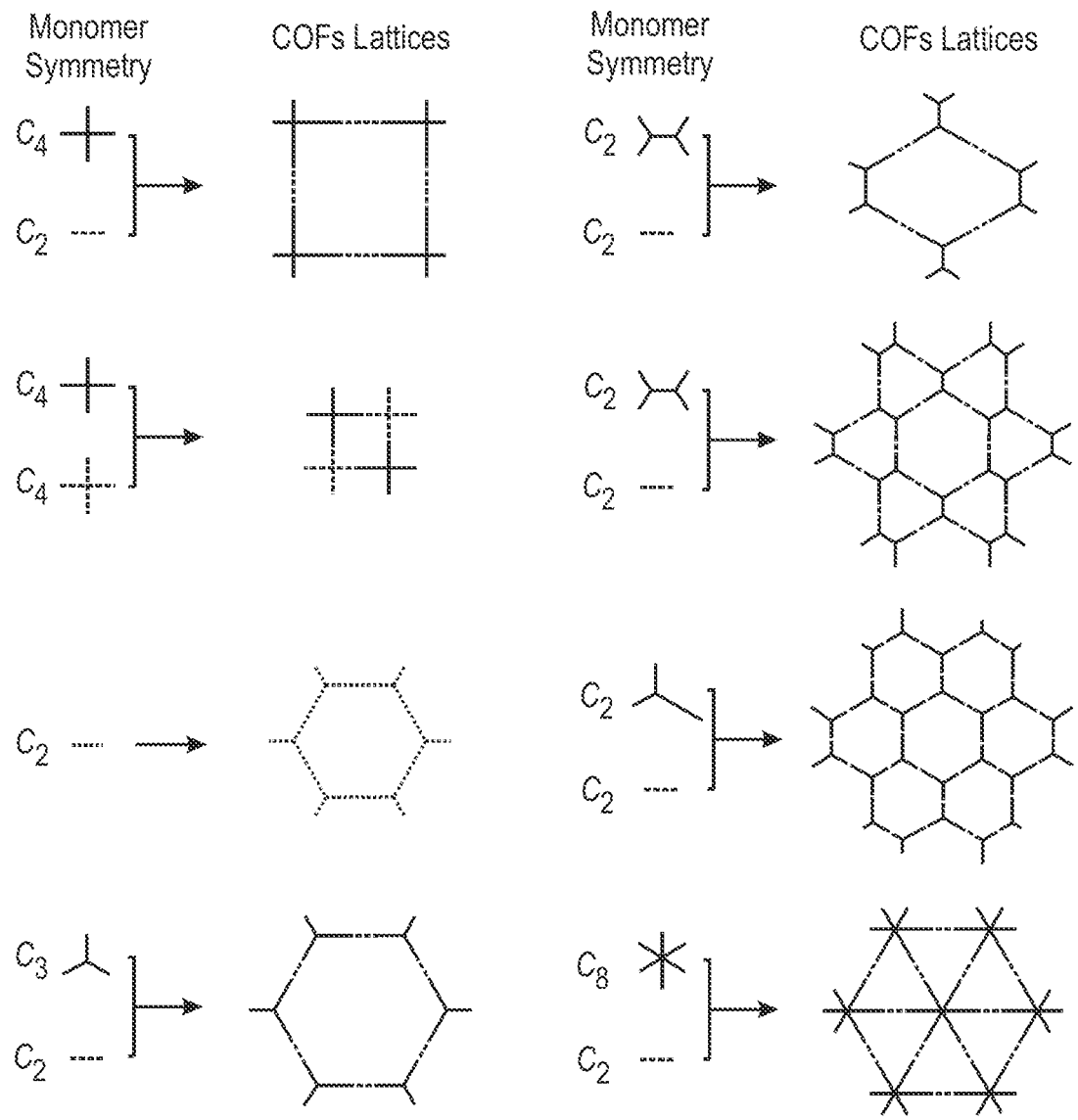
FIGS. 1A-1B show the basic topological diagrams for the design of two-dimensional (FIG. 1A) and three-dimensional (FIG. 1B) COFs.

Provided in the present disclosure are fluorescent covalent organic frameworks (COFs) for use in oil and gas applications. These environmentally friendly fluorescent COF materials can be utilized, for example, as tracers for waterfront mapping in the highly permeable zones of reservoirs. These tracers can be also used, for example, as tags for drill cuttings labeling to allow real-time accurate cuttings depth assignments. The tracers can also be used for well logging (or borehole logging), to determine the depths, subsurface formation, and events encountered while drilling.

In some embodiments, use of the fluorescent COF tracers allows for real-time detection of the tracers at the oil field. In some embodiments, the detection is performed using a UV camera and AI-recognition system. In some embodiments, the system is installed at the shale shaker. The methods of the present disclosure are a simple, fast, and automated approach for tagging and onsite detection.

The COF tracers of the present disclosure are extended structures that can multiply intensity and extend fluorescence lifetime of the tracer due to conjugation. The high stability of the COF materials is built in through covalent bonds. Further, the fluorescent COF tracers of the present disclosure can be considered green and environmentally friendly due to the chemical nature of the frameworks which is stable and does not contain toxic metal ions as a building blocks.

In some embodiments of the methods of the present disclosure, the fluorescent COFs agglomerate, resulting in enhanced fluorescence that is visibly detectable. In some embodiments, the macro-sized aggregates of fluorescent tags are used for drill cuttings fluorescent labeling where the possibility to intercalate a large quantity of small fluorescent nanotags into the macrostructure causes enhancement of the fluorescent response. In some embodiments, macroscopic labeling of the drill cuttings with high intensity fluorescence allows for building a simple and fast near real time tracer detection system.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately.

For example, a claimed act of doing X and a claimed act of doing Y can be conducted simultaneously within a single operation, and the resulting process will fall within the literal scope of the claimed process.

The term "downhole," as used in this disclosure, can refer to under the surface of the earth, such as a location within or fluidly connected to a wellbore.

Fluorescent Covalent Organic Frameworks

Covalent organic frameworks (COFs) are a class of 2D- and 3D-materials constructed from rigid organic building blocks that are connected through reactions between organic precursors resulting in formation of strong covalent bonds to afford porous, stable, and crystalline structures. COFs are a class of fully pre-designable polymers with unique conformations and morphologies. This is achieved by topology-diagram-directed polymer growth in conjunction with geometry matching between monomers. This molecular design principle is different from that of linear polymers, hyper-branched polymers, cross-linked polymers, and biopolymers, and increases the ability to predesign primary and high-order structures. In some embodiments of the methods of the present disclosure, the fluorescent COFs agglomerate, resulting in enhanced fluorescence that is visibly detectable. In some embodiments, the fluorescent COFs are environmentally friendly.

The COFs of the present disclosure are fluorescent COFs composed of covalently-bonded organic building blocks. The organic porous material has an ordered structure and possesses high specific surface area, high pore rate, regular pore size, easy regulation, flexible structure, easy functionalization, and has excellent thermal and chemical stability. In some embodiments, the building blocks of the COFs have π-backbones and a rigid conformation. Examples of building blocks (monomers) include benzene, simple arenes, heterocycles, and macrocycles. In some embodiments, one or more of the monomers is a fluorescent moiety. In some embodiments, the building blocks are designed to have different $C_2$, $C_3$, $C_4$, $C_6$, and $T_d$ geometries. In some embodiments, the monomers have one or more functional groups that include, but are not limited to, aldehyde, amine, boronic acid, catechol, squaric acid, quinone, methyl, anhydride, silanol, hydrazine, benzyl nitrile, cyano, tetrafluoro, and combinations thereof.

In some embodiments, the monomers have an aldehyde functional group. In some embodiments, the monomers are $C_2$ monomers with aldehyde functional groups. Examples of such monomers include, but are not limited to:

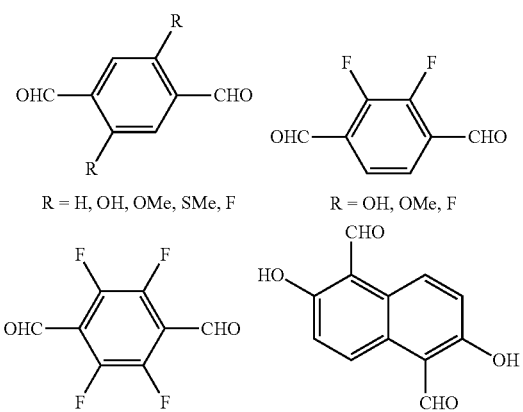

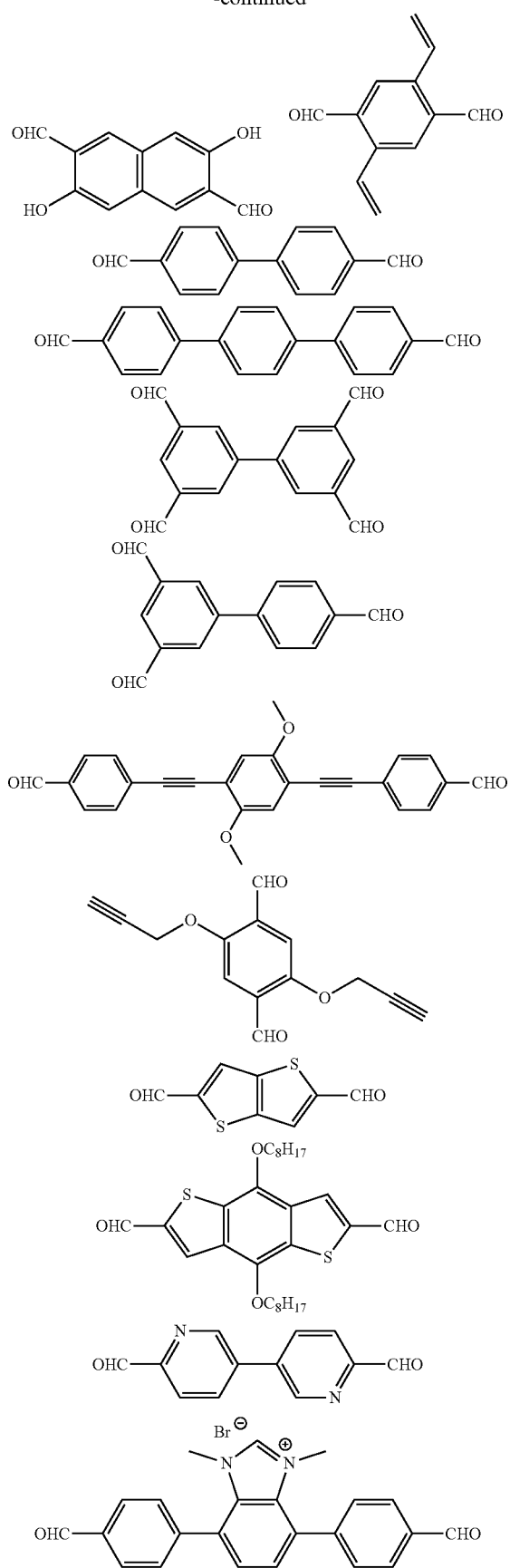
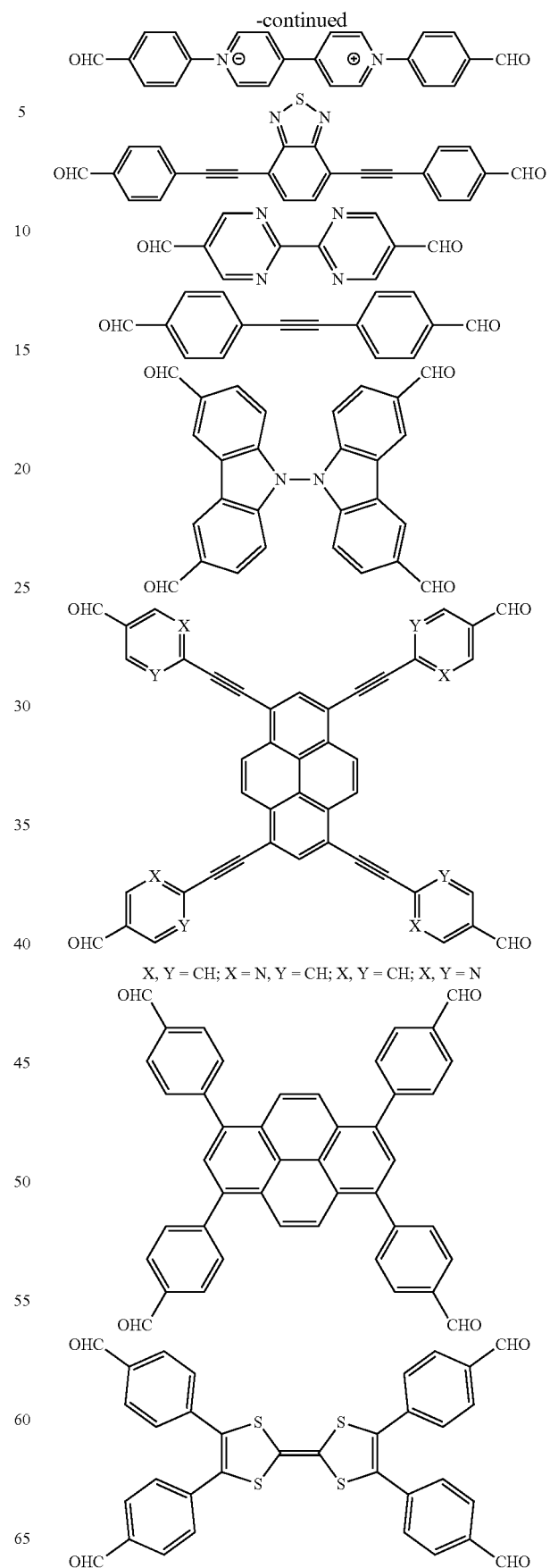

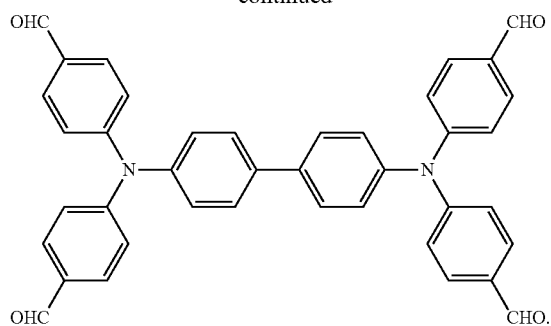
In some embodiments, the monomers are $C_3$ monomers with aldehyde functional groups. Examples of such monomers include, but are not limited to.
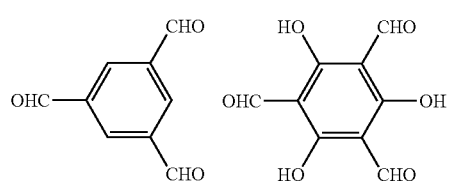
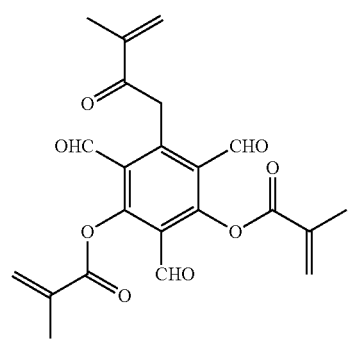
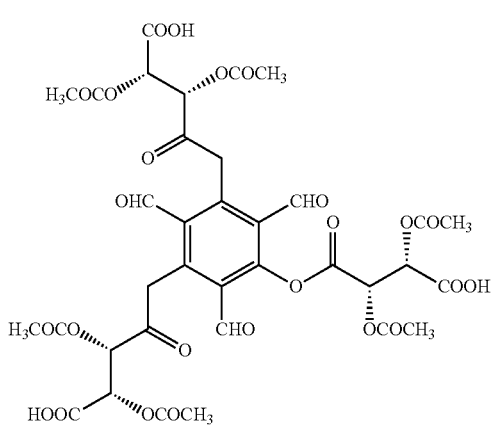
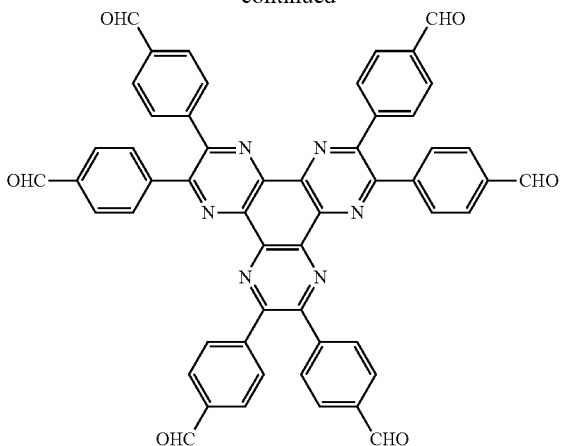
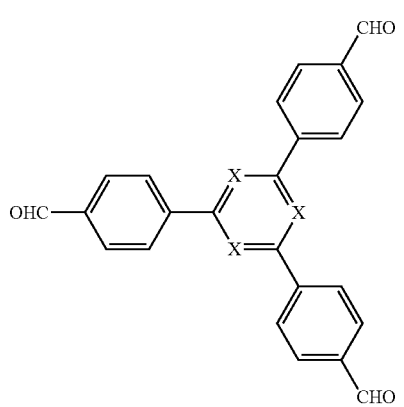
X = C, N
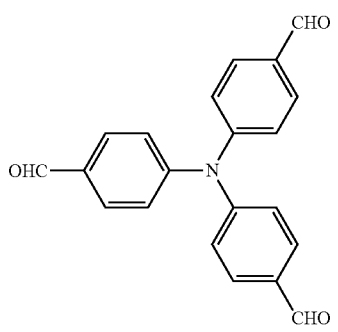
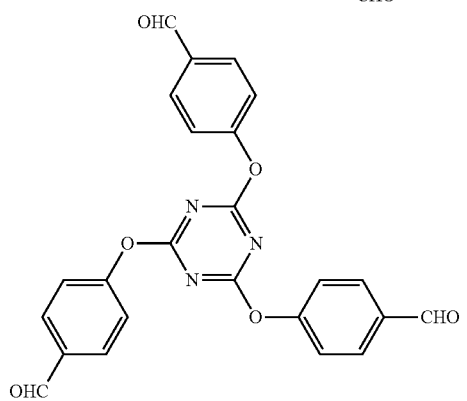

-continued
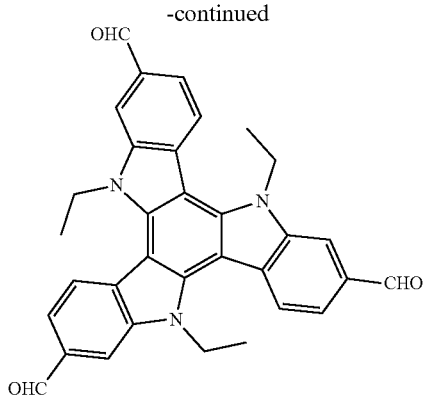
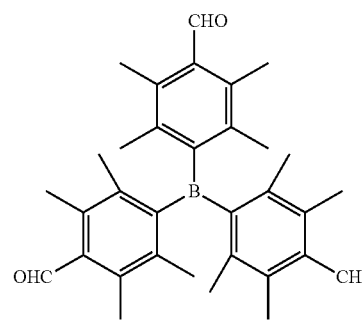
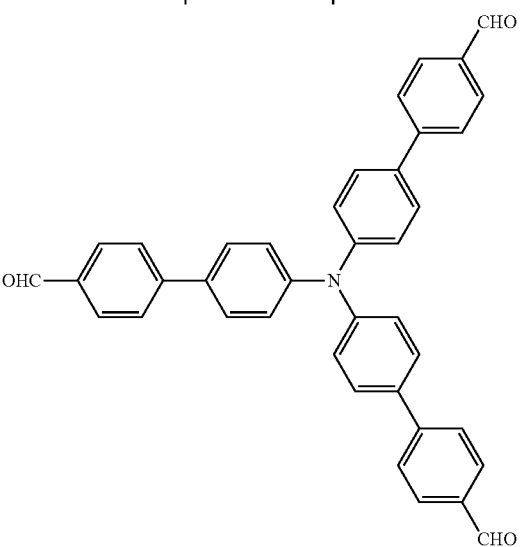
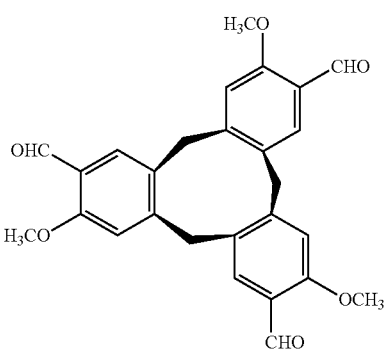
-continued
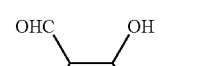
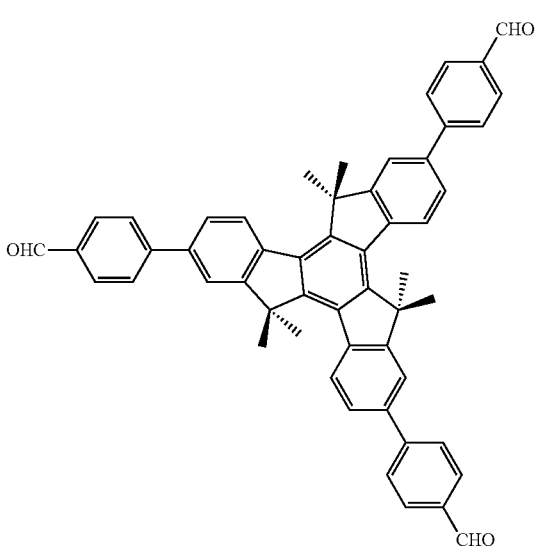
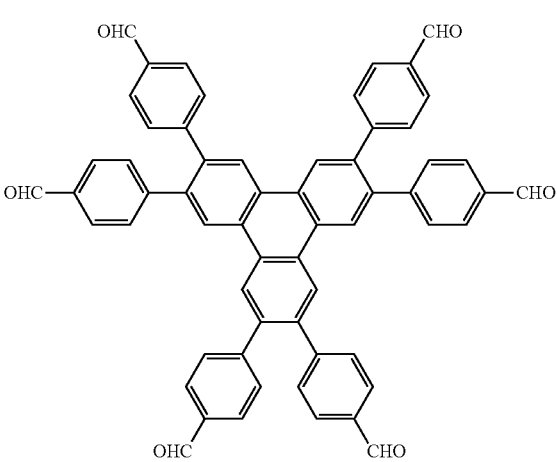

In some embodiments, the monomers are C₄ monomers with aldehyde functional groups. An example of such monomers includes, but is not limited to:

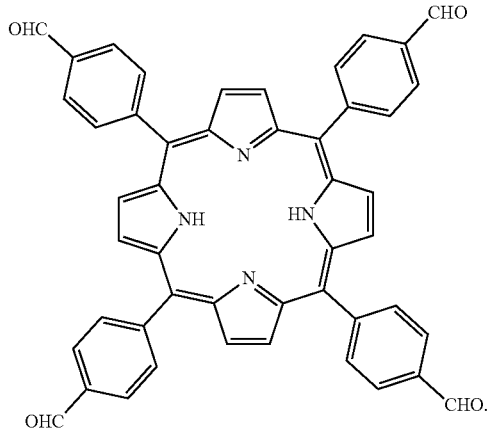 [SMILES: O=Cc1ccc(-c2c3nc(c(-c4ccc(C=O)cc4)c4ccc([nH]4)c(-c4ccc(C=O)cc4)c4nc(c(-c5ccc(C=O)cc5)c5ccc2[nH]5)C=C4)C=C3)cc1]

In some embodiments, the monomers are C₆ monomers with aldehyde functional groups. An example of such monomers includes, but is not limited to: CHO

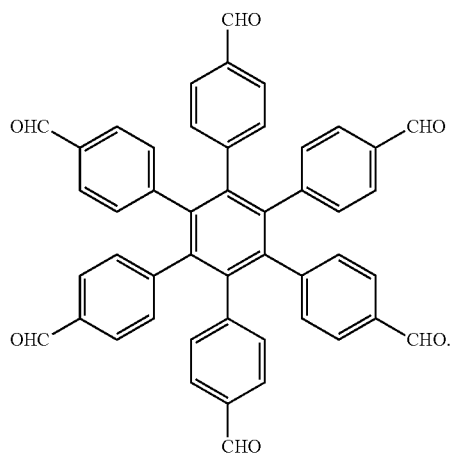 [SMILES: O=Cc1ccc(-c2c(-c3ccc(C=O)cc3)c(-c3ccc(C=O)cc3)c(-c3ccc(C=O)cc3)c(-c3ccc(C=O)cc3)c2-c2ccc(C=O)cc2)cc1]

In some embodiments, the monomers are T$_d$ monomers with aldehyde functional groups. An example of such monomers includes, but is not limited to:

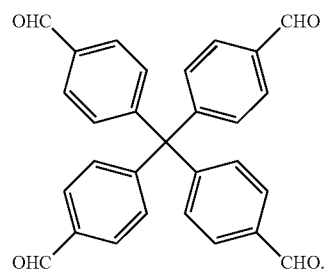 [SMILES: O=Cc1ccc(C(c2ccc(C=O)cc2)(c2ccc(C=O)cc2)c2ccc(C=O)cc2)cc1]

In some embodiments, the monomers have an amine functional group. In some embodiments, the monomers are C₂ monomers with amine functional groups. Examples of such monomers include, but are not limited to:

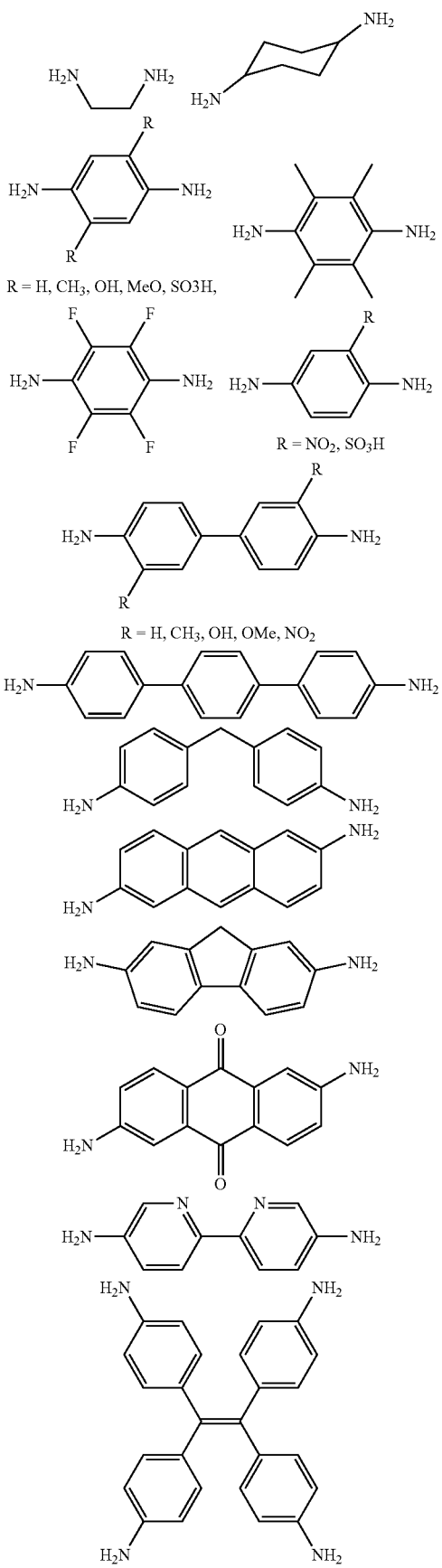

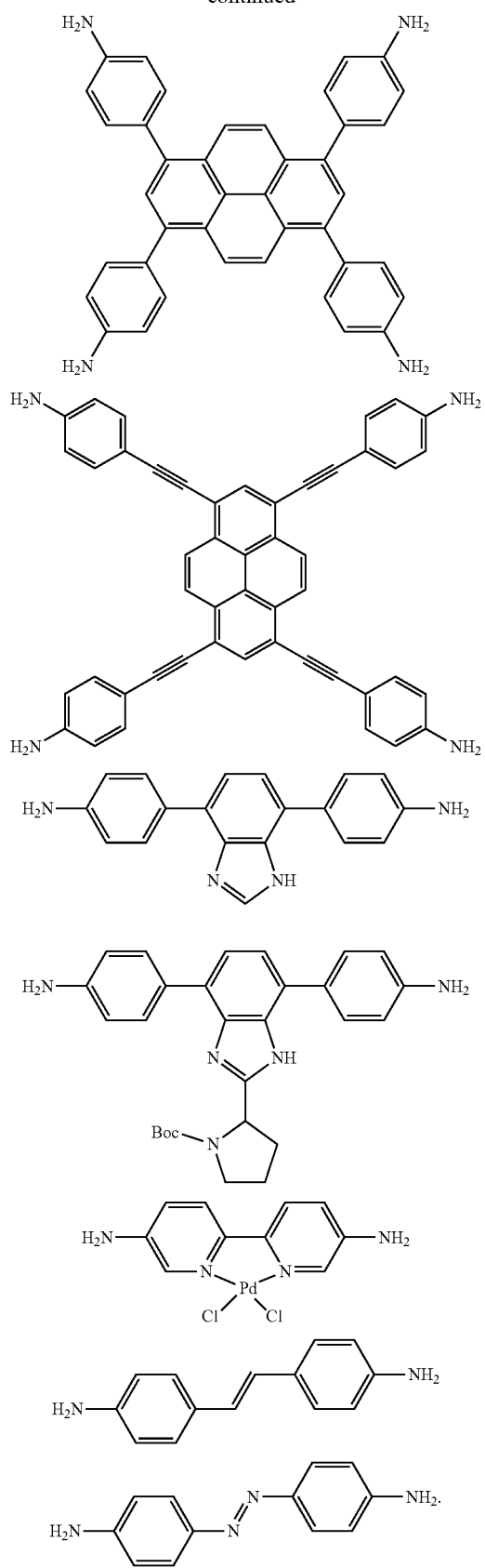
In some embodiments, the monomers are C$_3$ monomers with amine functional groups. Examples of such monomers include, but are not limited to:
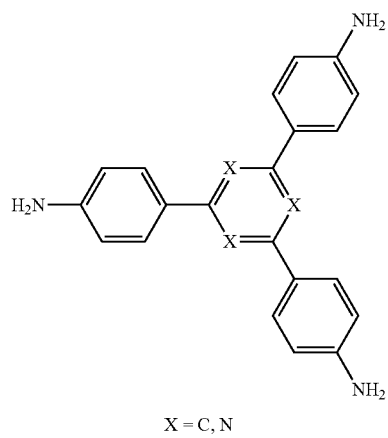
X = C, N
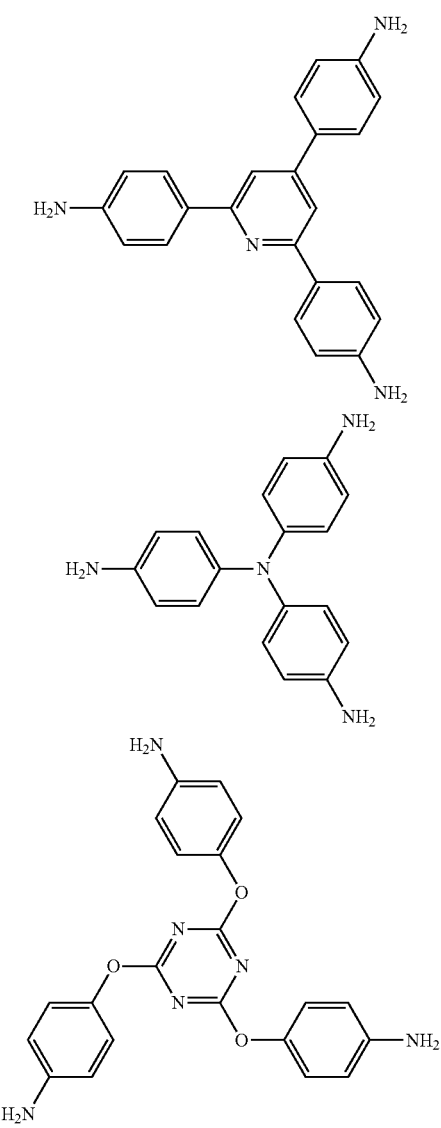

-continued
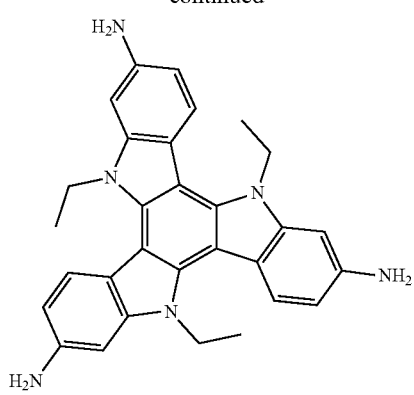
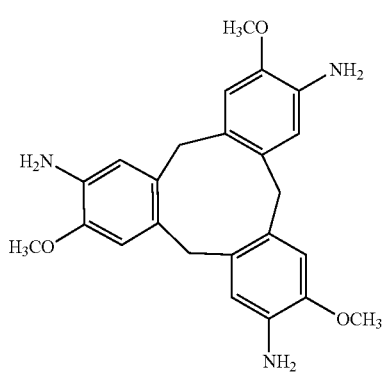
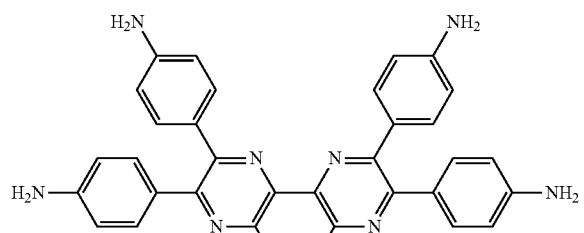
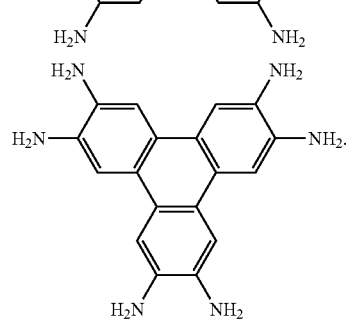
In some embodiments the monomers are $C_4$ monomers with amine functional groups. Examples of such monomers include, but are not limited to:
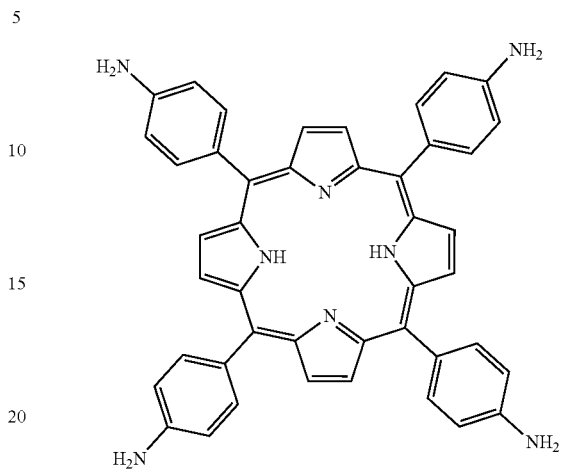
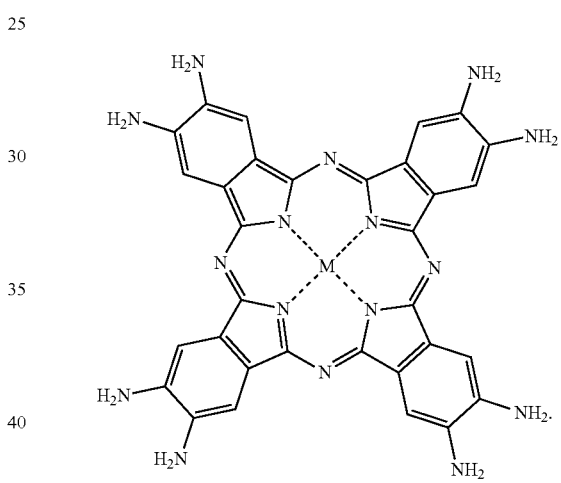
In some embodiments, the monomers are $C_6$ monomers with amine functional groups. Examples of such monomers include, but are not limited to:
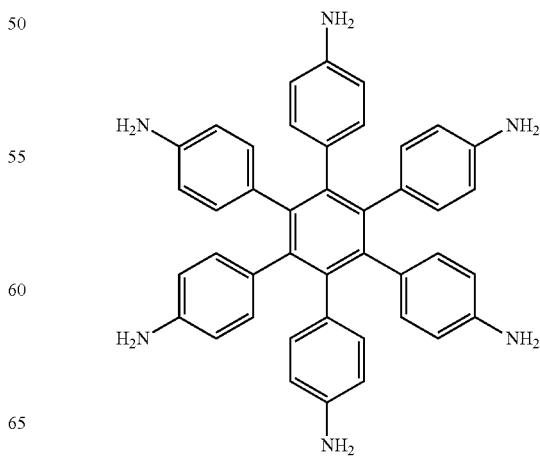

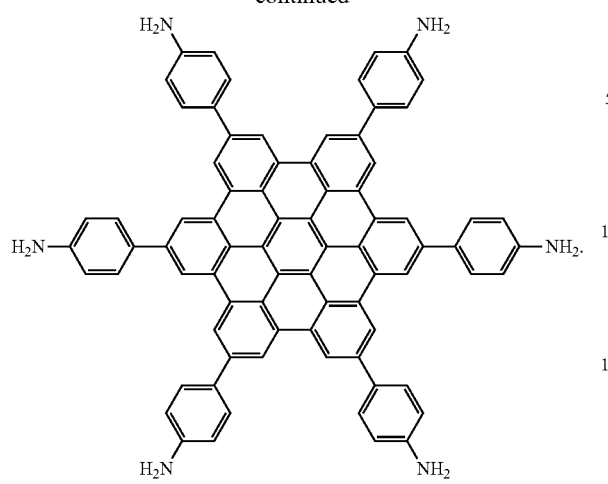

In some embodiments, the monomers are T$_d$ monomers with amine functional groups. An example of such monomers includes, but is not limited to:

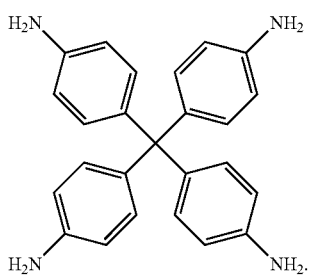 [SMILES: Nc1ccc(C(c2ccc(N)cc2)(c2ccc(N)cc2)c2ccc(N)cc2)cc1]

In some embodiments, the monomers have one or more functional groups, including, but not limited to, boronic acid, catechol, squaric acid, quinone, methyl, anhydride, silanol, hydrazine, benzyl nitrile, cyano, tetrafluoro, and combinations thereof. Examples of such monomers include, but are not limited to:

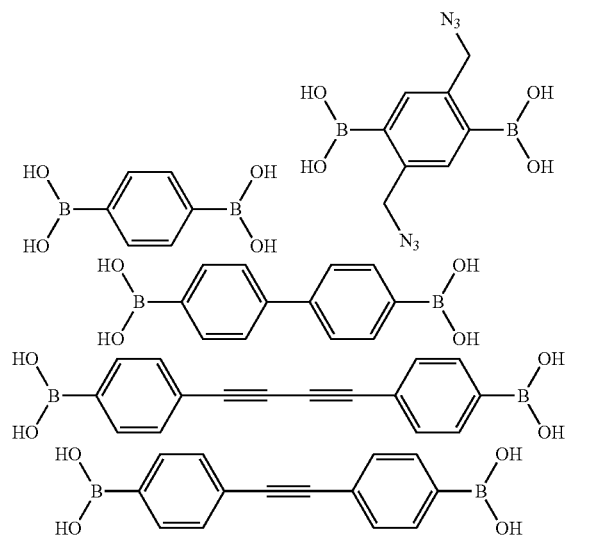

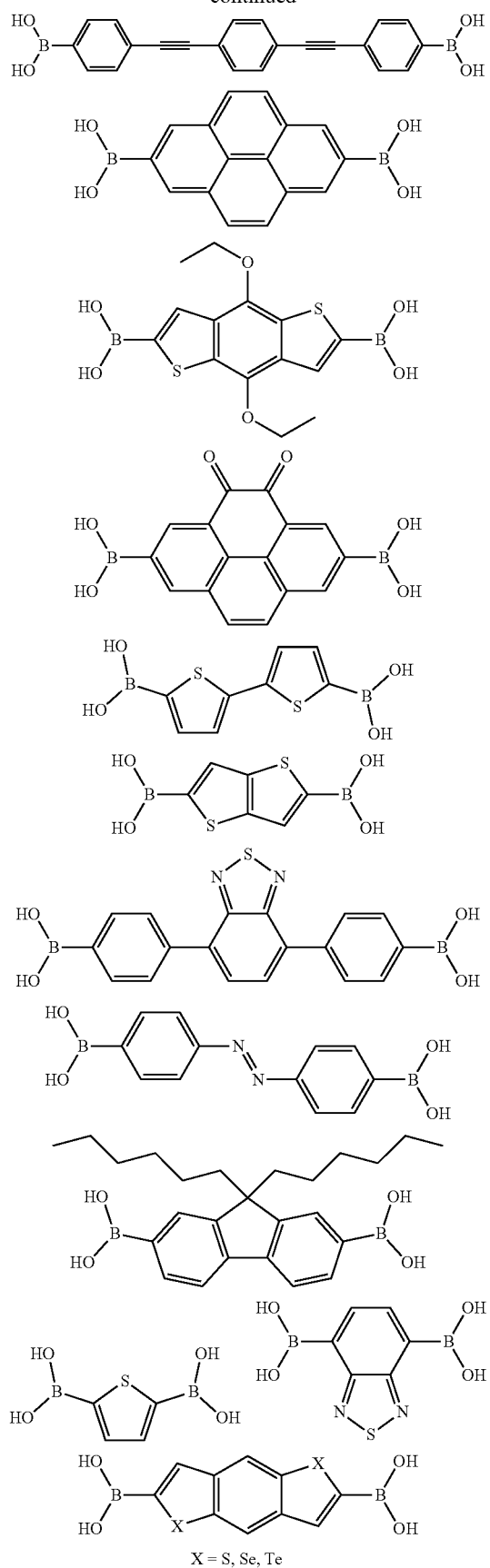

-continued
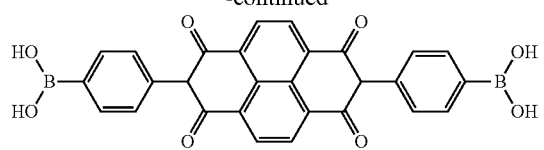
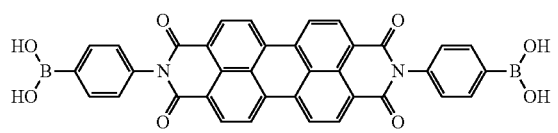
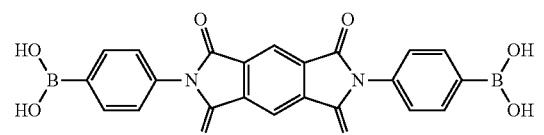
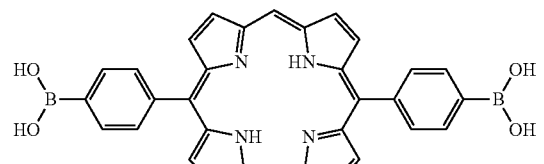
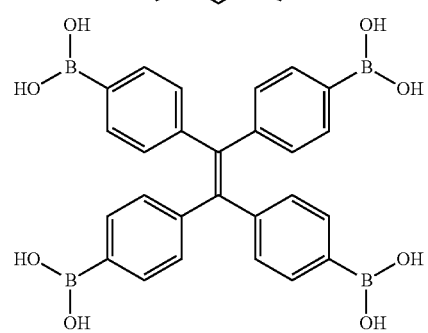
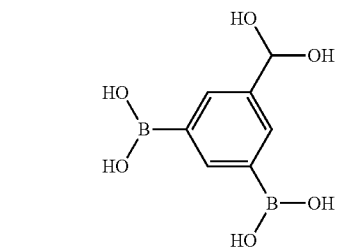
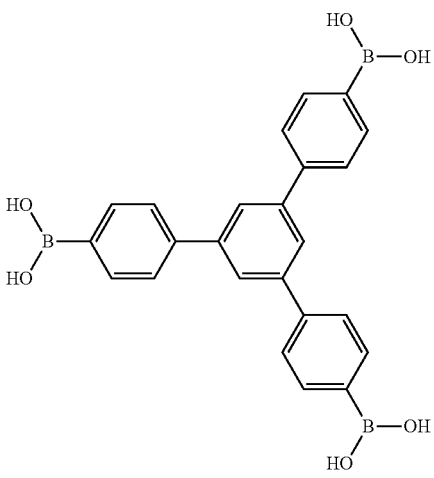
-continued
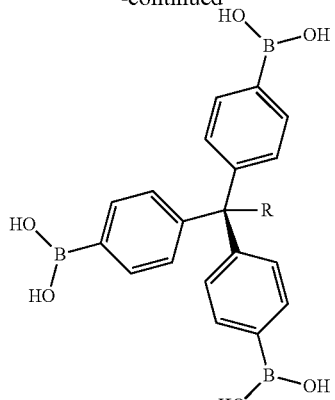
R = Tolyl, allyl, -(CH$_2$)$_{11}$-CH2
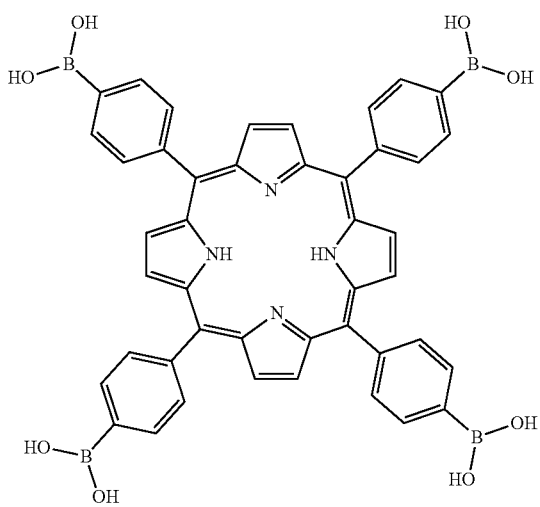
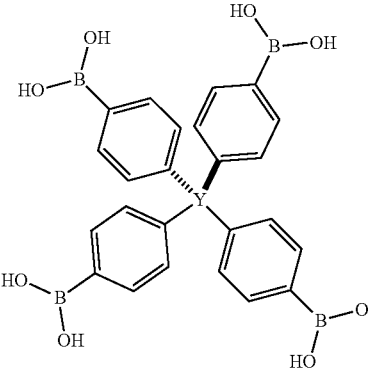
Y = C, Si
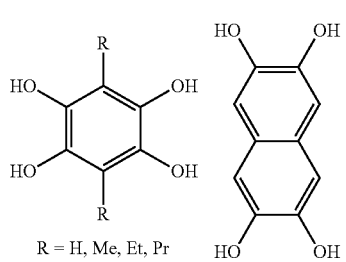
R = H, Me, Et, Pr

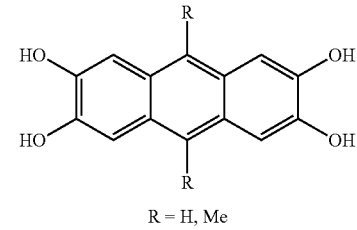
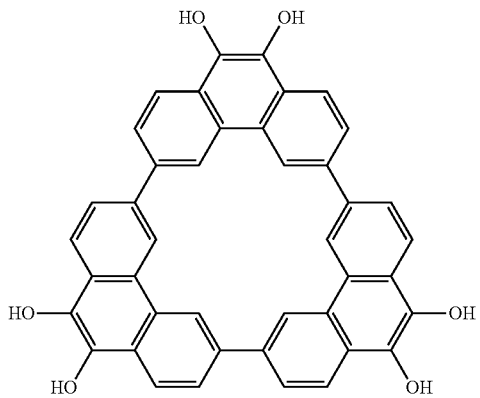
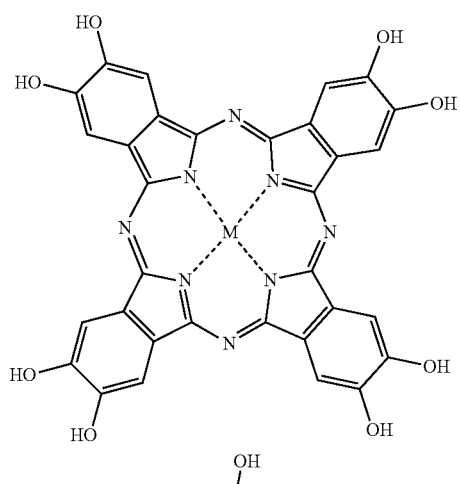
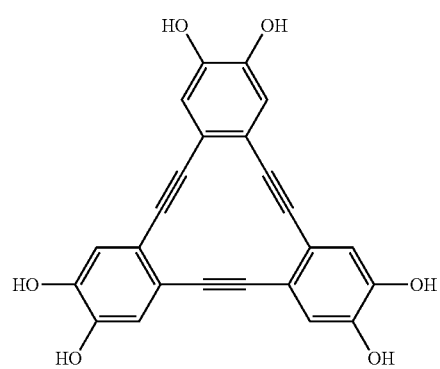
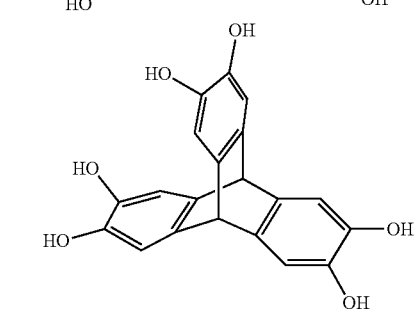
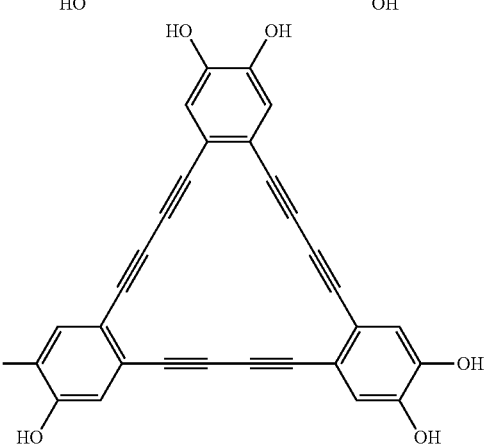
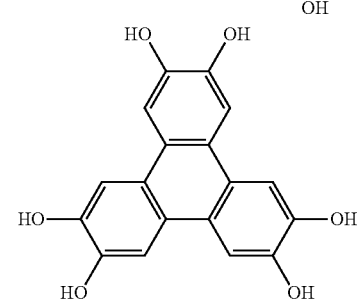
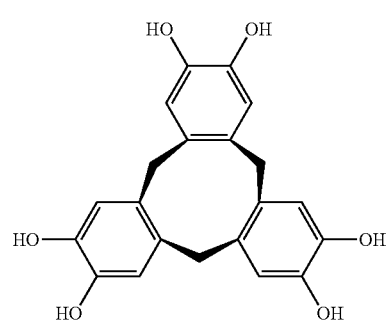
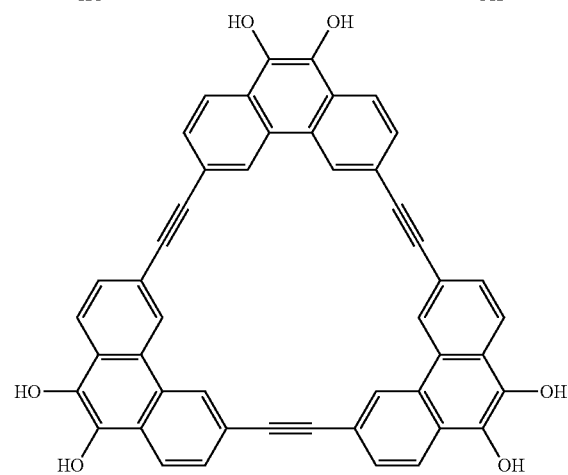

23
-continued
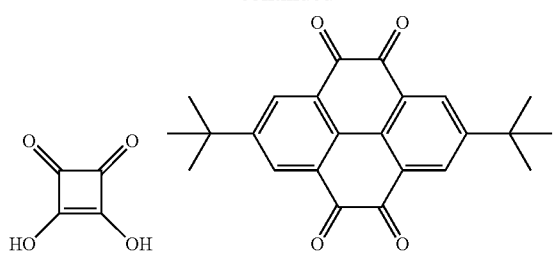
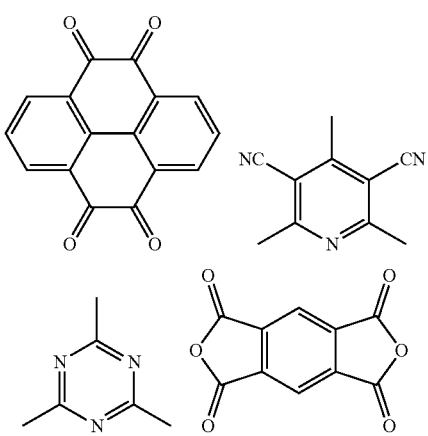
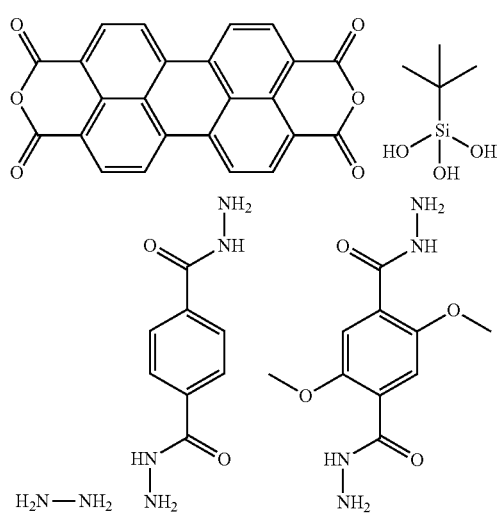
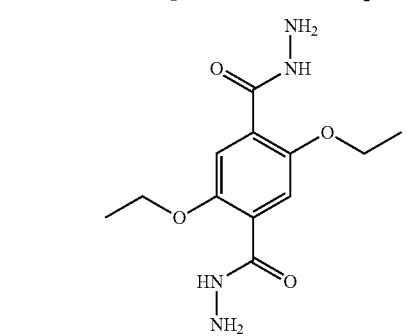
24
-continued
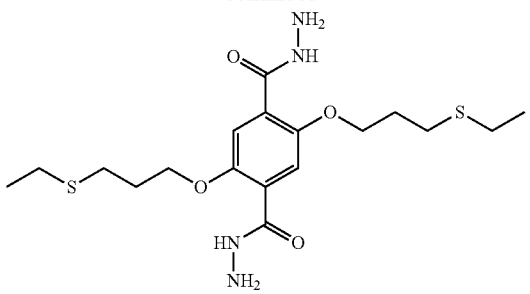
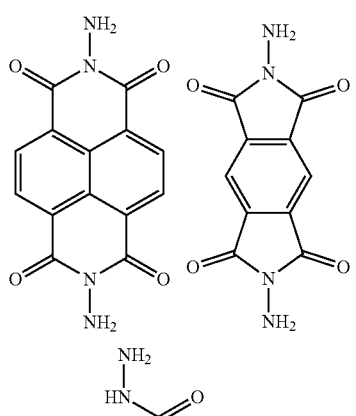
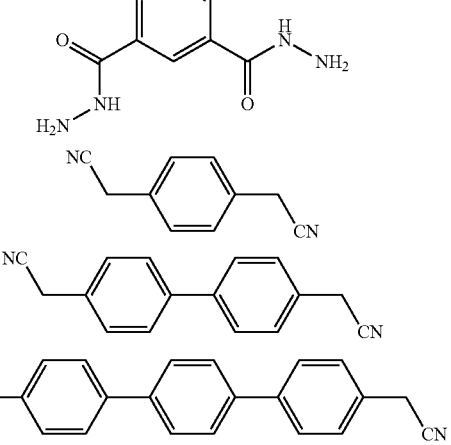
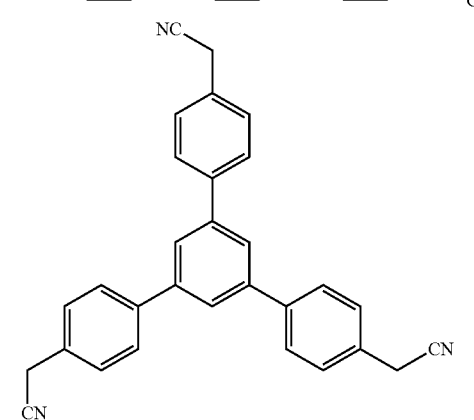

-continued

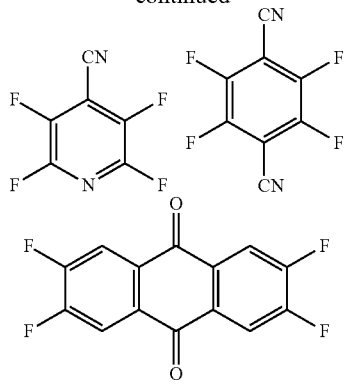

In some embodiments, the COF is a two-dimensional COF. Examples of two-dimensional COFs include, but are not limited to, tetragonal COFs, rhombic COFs, kagome-type COFs, triangular COFs, and heteropore COFs. The topological diagram for the design of a two-dimensional COF is shown in FIG. 1A.

Figure 1B:
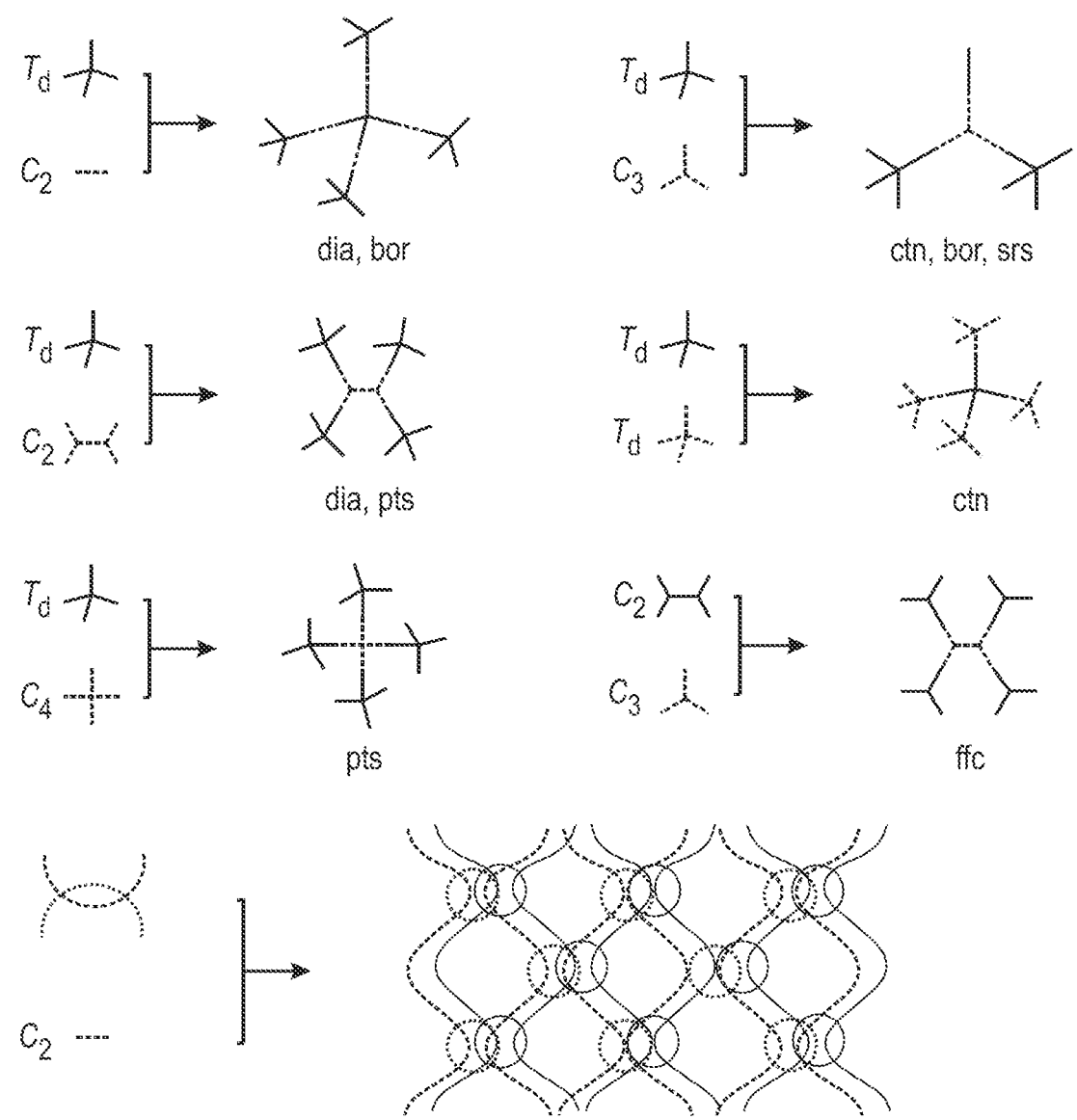

In some embodiments, the COF is a three-dimensional COF. In some embodiments, the three-dimensional COF has at least one building block having $T_d$ or orthogonal geometry. In some embodiments, the three-dimensional COF has a network selected from ctn, bor, dia, srs, rra, and pts. The topological diagram for the design of a three-dimensional COF is shown in FIG. 1B.

The COFs of the present disclosure are fluorescent COFs. In some embodiments, the COFs possess fluorescence as an intrinsic property of the porous chemical nature of the framework. In some embodiments, the COFs possess fluorescence due to inclusion of a fluorescent reagent into the macromolecular voids. In some embodiments, COF materials are engineered on the principles of isoreticular chemistry to provide large numbers of pre-designable structures with tunable physico-chemical properties. The extended structure of covalent organic frameworks connected via covalent linking allows the formation of highly-stable macromolecules with fully conjugated system of chemical bonds.

In some embodiments, the fully conjugated structure of the COFs acts as a conductor and enhances fluorescence through photo-induced energy transfer. In some embodiments, the COFs are tunable, allowing for design of various frameworks with specific fluorescence emission wavelengths. Additionally, in some embodiments, the porous nature of the frameworks is used as a matrix for fluorescent molecules intercalation as well as for post-synthetic modification with fluorophores. Thus, the fluorescent COFs of the present disclosure can be obtained, for example, due to the intrinsic fluorescence of the framework due to fluorescence of building blocks, from post-synthetic modification of the pores of the COFs with covalent attachment of fluorescent agents, and through the fluorescence of the framework due to intercalation of fluorophores.

In some embodiments, the rigidity of the core of the COFs and the fixed pores geometry prohibits aggregation-caused fluorescence quenching and thus provides an advantage in fluorescence intensity over ordinary fluorescent-labelled polymers.

COFs Composed of Fluorescent Building Blocks

In some embodiments, the COFs used in the methods of the present disclosure are composed of one or more fluorescent building blocks (fluorophores). For example, the fluorescence of the covalent organic frameworks could be due to emitting properties of the precursor building blocks linked together to form a framework structure. The rigid and fixed positioning of the linkers in the frames will prevent aggregation of the fluorescent moieties. Conjugation of chemical bonds between glowing monomers could enhance energy transfer between different parts of macromolecules and induce strong emission involving excitation of several fluorophores.

Examples of suitable fluorophore building blocks include, but are not limited to, carbazole, pyrene, tetraphenylethylene, triphenylbenzene, triazine, perylene, tetraphenylthiophene, triphenylene, and tetrazine. In some embodiments, the fluorophore monomer is selected from.

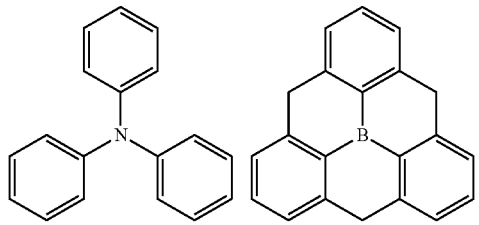

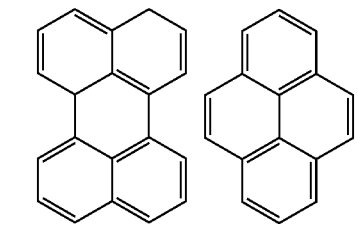

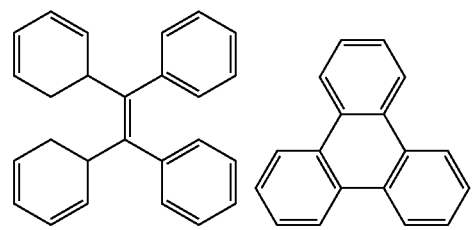

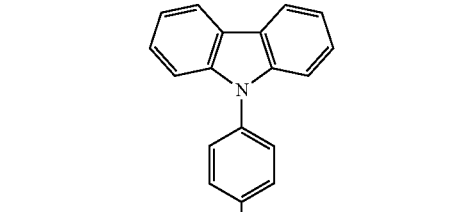

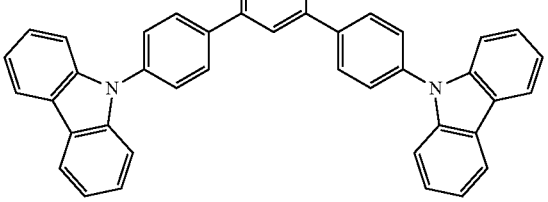

27
-continued

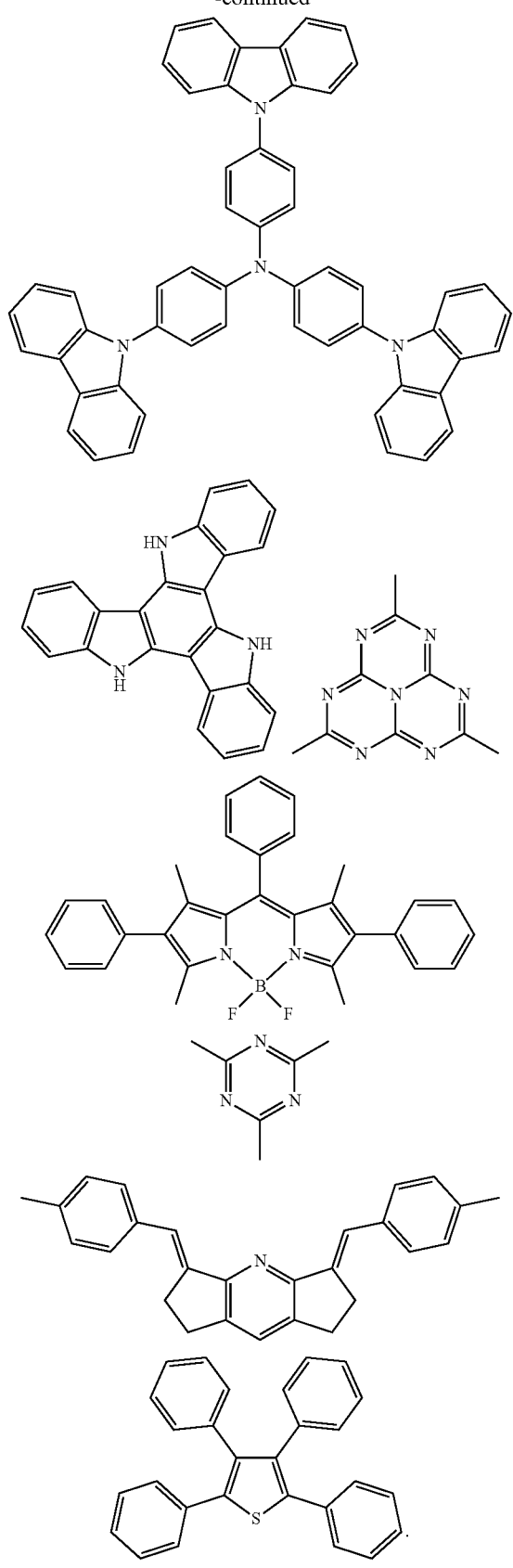

In some embodiments, the fluorescent COF contains a fluorophore in combination with one or more rigid building blocks or heterocyclic units, such as described in the present disclosure. In some embodiments, the fluorescent COF contains a rigid building block selected from:

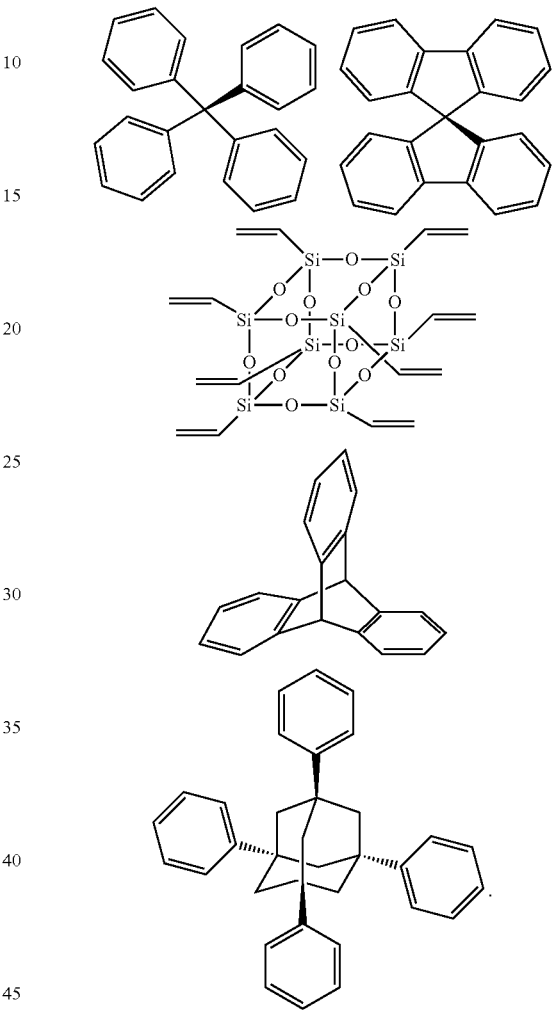

In some embodiments, the fluorescent COF contains a heterocyclic unit building block selected from:

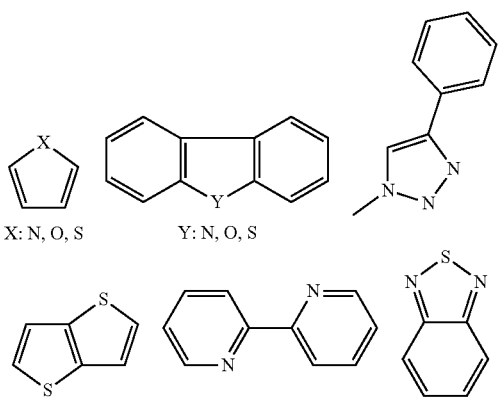

-continued
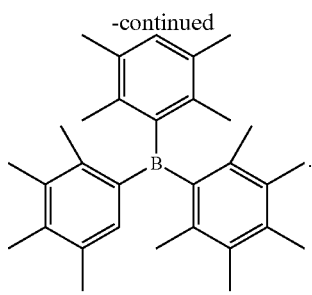
In some embodiments, the fluorescent COF is composed of the following scaffold:

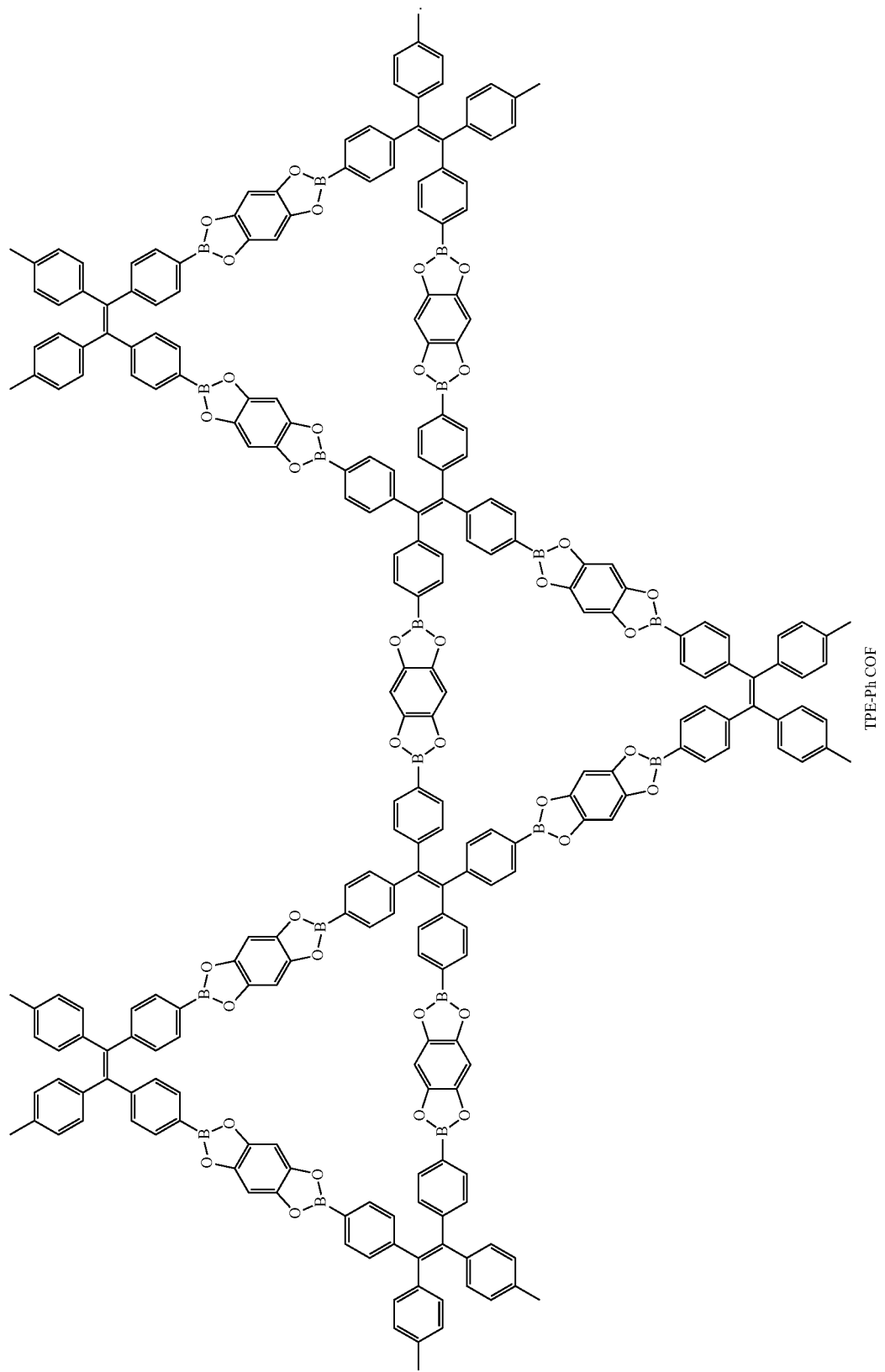

In some embodiments, the COF composed of fluorescent building blocks includes any one of the COFs disclosed in Geng et al., Chem. Rev. (2020) 120(16):8814-8933, which is incorporated herein by reference in its entirety.

Post-Synthetic Modification

In some embodiments, the COFs used in the methods of the present disclosure are fluorescent due to post-synthetic modification of a non-fluorescent COF with fluorescent moieties. In some embodiments, the fluorescent moieties are covalently attached to the pores and/or channels of the COF. In some embodiments, post-synthetic modification of channels and voids of covalent organic frameworks results in formation of fluorescent materials with the glowing fragments covalently and regularly attached to the frameworks' core. Due to regular alignment of fragments for modification in the 2D or 3D-extended COF core, spacing of covalently attached fluorophores will prevent their aggregation.

Figure 2:
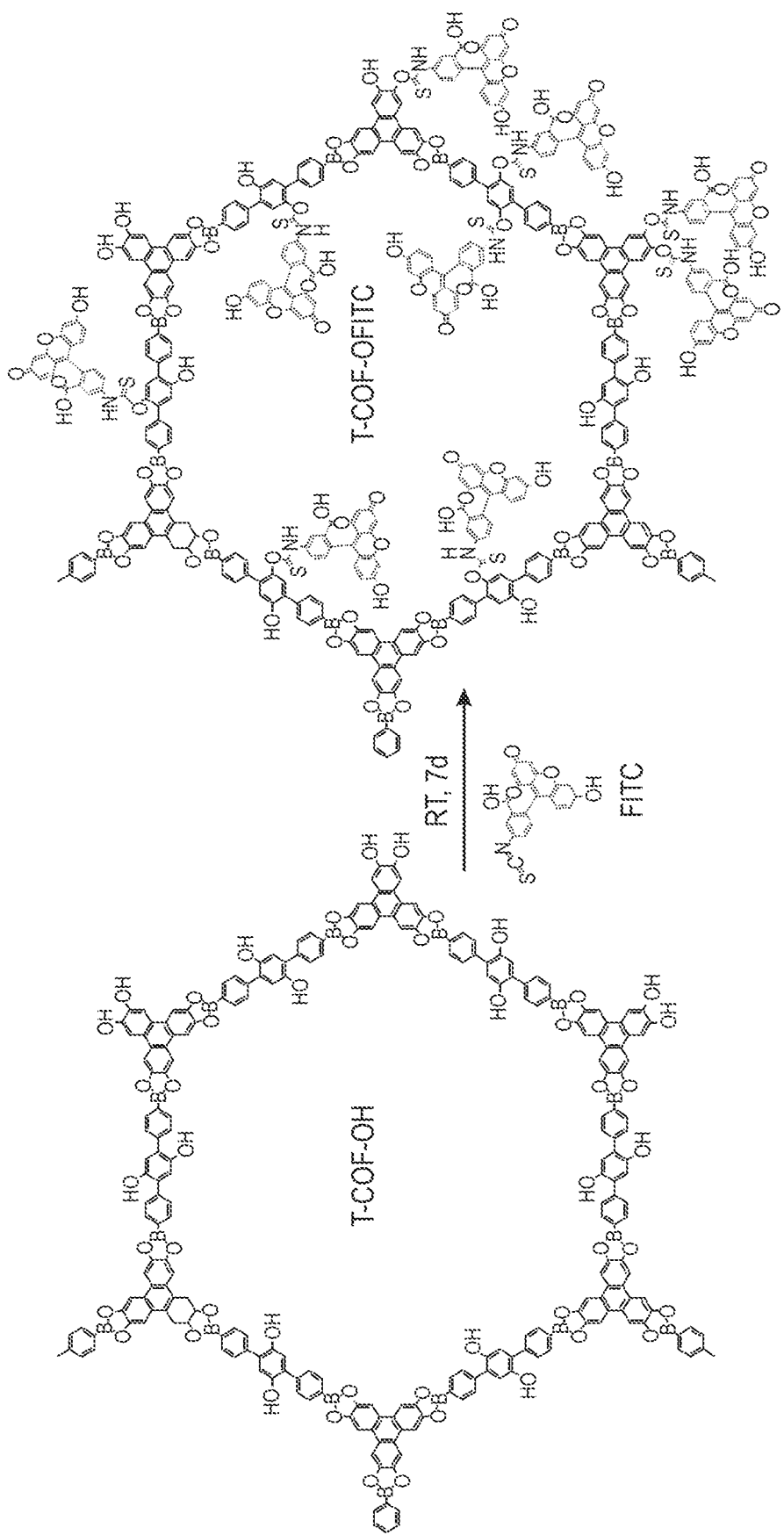
FIG. 2 shows the post-synthetic modification of a non-fluorescent COF with fluorescent moieties.

Examples of suitable fluorescent moieties that can be used for post-synthetic modification of a COF include, but are not limited to, derivatives of the rhodamine family of dyes, derivatives of the BODIPY family of dyes, derivatives of the DABCO family of dyes, cyanine and cyanine derivatives, xanthene and xanthene derivatives, fluorescein, fluorescein derivatives, fluorescein isothiocyanate, acridine, acridine derivatives, coumarin derivatives, pyrene derivatives, anthracene derivatives, 4',6-diamidino-2-phenylindole dihydrochloride and other phenylindole derivatives, squaraine derivatives, naphthalene derivatives, oxadiazole derivatives, anthracene derivatives, oxazine derivatives, arylmethine derivatives, tetrapyrrole derivatives, and 8-hydroxyquinoline derivatives. In some embodiments, the fluorescent moiety is fluorescein or a fluorescein derivative. In some embodiments, the fluorescein or fluorescein derivative is fluorescein isothiocyanate (FITC). In some embodiments, the post-synthetic modification of a non-fluorescent COF with fluorescent moieties involves modifying a COF with FITC, as shown in FIG. 2.

In some embodiments, moieties that can be used for COF intercalation and post-synthetic modification include salts, ions, and oxides of rare earth elements that interact with the framework's core to form fluorescent materials. Examples of such moieties include, but are not limited to, derivatives of yttrium (Y), samarium (Sm), europium (Eu), cerium (Ce), lanthanum (La), and terbium (Tb), erbium (Er), ytterbium (Yb), neodymium (Nd).

In some embodiments, moieties that can be used for post-synthetic modification of a COF include lanthanide complexes that form between the organic chelating building blocks of COFs, such as salen-type ligands and lanthanide salts. Examples of such moieties include, but are not limited to, lanthanides such as Eu(III), Sm(III), Tb(III), La(III) and Dy(III), and other moieties such as Ce, Pr, Nd, Pm, Sm, Eu, Gd, Tb, Dy, Ho, Er, Tm, Yb, and Lu. In some embodiments, lanthanide luminescent probe emission increases about six-fold when decreasing the pH of a solution from six to two. In some embodiments, this property is utilized for the detection of sour gases in the drilling formation.

In some embodiments, moieties that can be utilized for induction of the framework materials' fluorescence are ions and gases that react with the framework to switch on fluorescence. Examples of such moieties include, but are not limited to, a proton, metal ions, iodine, fluorine, nitrogen oxides, carbon dioxide, hydrogen sulfide, chlorine and chloride ion.

Intercalation Offluorophores Inside the COF Pores

Figure 3:
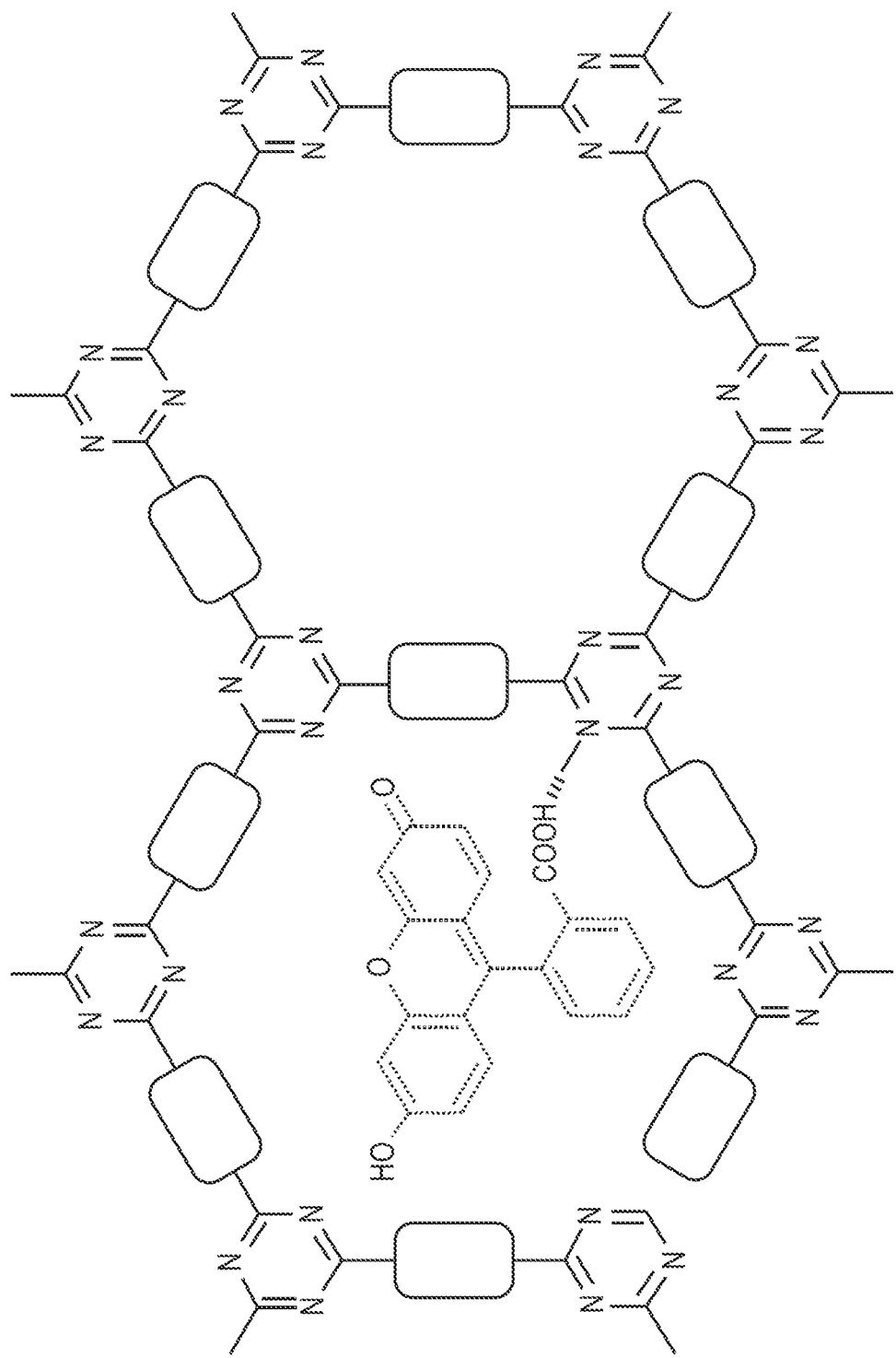
FIG. 3 depicts a COF pore loaded with a fluorescent dye.

In some embodiments, the COFs used in the methods of the present disclosure are fluorescent due to intercalation of a fluorophore into a non-fluorescent COF matrix as a guest molecule. In some embodiments, specific pore geometry and dimensions in the COFs can be tuned and allows capture and storage of only the appropriate fluorophore molecules in a separate cage to exclude possibility of aggregation-induced fluorescence quenching. Thus, in some embodiments, fluorophores are loaded into the channels and pores of a COF. An example of such a COF is shown in FIG. 3.

In some embodiments, fluorescent molecules and materials matching the size of the pores of the covalent organic framework are used for intercalation. Examples of such molecules and materials include, but are not limited to, rare earth metal ions and oxides, fluorescent dyes, fluorescent quantum dots, fluorescent lanthanides complexes, fluorescent nanoparticles and others.

In some embodiments, the fluorescent framework materials are incorporated into the composites and/or protected with glass, ceramic, or polymeric matrixes to insulate the fluorescent materials from the leakage and/or destructive influence of the downhole environment as well as for enhancement of the materials' connectivity or to increase adsorption to the formation.

Methods

Any fluorescent COF can be used in the methods of the present disclosure, such as the fluorescent COFs described in the present disclosure or those obtained by the techniques described in the present disclosure. For example, the fluorescent COF tracer can contain fluorescent building blocks, covalently attached fluorescent moieties, fluorophores loaded into the channels and pores of the COF, or a combination thereof. In some embodiments, the fluorescent COF tracer contains fluorescent building blocks. In some embodiments, the fluorescent COF tracer contains covalently attached fluorescent moieties, such as fluorescent moieties covalently attached by post-synthetic modification of a non-fluorescent COF. In some embodiments, the fluorescent COF tracer contains fluorophores loaded into the channels and pores of the COF, such as a non-fluorescent COF. In some embodiments, the fluorescent COFs are environmentally friendly.

The fluorescent COFs can be utilized as tracers or tags in oil and gas applications. In some embodiments, the fluorescent COFs are used to tag drill cuttings, to map the waterfront in the highly permeable zones of reservoirs, or both. In some embodiments, the tags are mixed with drilling mud and attached to pieces of formation at the drill bit face to identify the depth of the drill cuttings. In some embodiments, the labelled cuttings are separated on a shale shaker upon the drill cuttings return with circulation of the drilling mud. In some embodiments, the shale shaker is located on-site at the well, thereby allowing for real-time identification and analysis.

Figure 5:
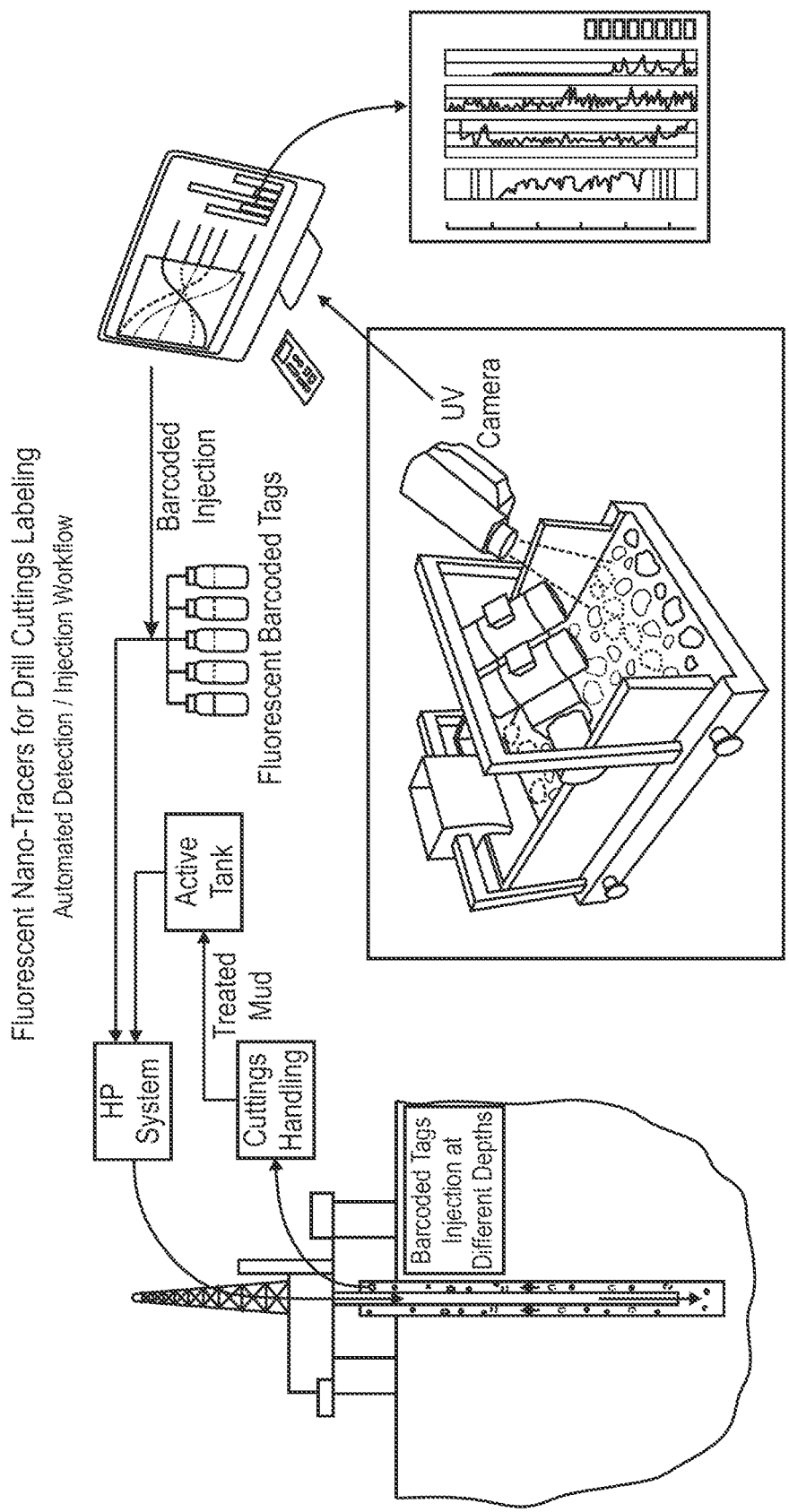
FIG. 5 illustrates application of fluorescent COF tracers in drill cuttings depth identification.

The fluorescent COF tracers of the present disclosure can be used for drill cuttings labeling and well logging, for example, according to the depth of the drill cuttings. The fluorescent COF tracers could be transported via the drill string into a well and could face formation at the drill bit site. Upon drilling, drill cuttings are formed and could be labeled by injecting the fluorescent tracers into the formed drill cuttings, for example, by breaking capsules with encapsulated tags or tag solutions. In some embodiments, hydraulic circulation of the drilling mud pumps the generated cuttings with the fluorescent COF tags (tracers) upwards towards the annulus. In some embodiments, the drill cuttings with the fluorescent COF tracers travel upwards to the shale shaker. At the shaker site the drill cuttings bearing the fluorescent tags could be separated from the mud and the fluorescent COF tracer could be detected using UV light and a camera (FIG. 5).

Primary detection and identification of the fluorescent COF tracers can be done at the field (on-site at the well). In some embodiments, the detection and identification is based on the fluorescent response of the tracer. For example, detection of the fluorescent COF tracer can be carried out at a shale shaker using an ultraviolet (UV) light-equipped camera and an artificial intelligence (AI)-based camera recognition system. The enhanced fluorescent efficiency of the fluorescent COF tracers, as compared to known fluorescent tracers that do not contain a COF structure, can be additionally favorable for the AI-based camera-recognition technology. In some embodiments of the methods of the present disclosure, the fluorescent COFs agglomerate, resulting in enhanced fluorescence that is visibly detectable.

In some embodiments, the fluorescent COF tracers can be further identified, such as in a laboratory. For example, identification of the fluorescent COF tracers can be further performed with extraction and utilization of analytical methods that include, but are not limited to, fluorimetry, Fourier transform infrared (FTIR) spectroscopy, powder X-ray diffraction (PXRD), X-ray fluorescence (XRF), nuclear magnetic resonance (NMR) spectroscopy, gas chromatography (GC) or liquid chromatography (LC) and mass spectrometry (MS). For example, the presence of specific functional groups in the COF frameworks can be detected with FTIR; specific patterns of the crystal structure can be detected with PXRD and XRF; NMR can be utilized for detection of the unique chemical structure of the organic frameworks; MS, or a combination of GC or LC and MS can provide data on the molecular weight of the building blocks and/or guest molecules of the COFs; and the specific fluorescent emission wavelength can be recorded and estimated via fluorimetry. Thus, in some embodiments of the methods of the present disclosure, the fluorescent COF tracers are detected not only by the unique fluorescent emission wavelength and fluorescent emission spectra of the tracer, but by a secondary analytical method as well.

In some embodiments of the methods of the present disclosure, fast, on-site primary detection of the fluorescent COFs is carried out using an UV light-equipped camera. In some embodiments, the camera is placed on top of a shale shaker, such as an on-site shale shaker. The enhanced fluorescent efficiency of the fluorescent COFs of the present disclosure allows for recognition of the AI-based camera tags.

In some embodiments, a variety of fluorescence wavelengths of the fluorescent COF tracers that can be used in the methods of the present disclosure allows for barcode tracing parameters (depth of drill cuttings origin). For example, the unique properties of the fluorescent COF tracers could be used to program sequenced release of the tracers and thus to barcode the labelling parameters (depth of cuttings). In some embodiments, the injection of the fluorescent COF tracers is programmed according to the sequence of the color of the fluorescent response or color of the fluorescent response of the tracer/PXRD-pattern of the material or combinations of the color of fluorescent response/PXRD-patterns/molecular mass of building blocks and particles size and shapes for unique barcoding the labelling parameters. In some embodiments, the programmed barcoded injection and identification of the fluorescent COF tracers is based on three parameters: color of the fluorescent response, molecular weight of the porous materials monomers, and the powder X-ray diffraction patterns of the unit cell of the tagging material. In some embodiments, the programmed barcoded injection and identification of the fluorescent COF tracers is based on four parameters: color of the fluorescent response, molecular weight of the porous materials forming monomers, the powder X-ray diffraction patterns of the unit cell of the tagging material, and the particles size and shape of the injected tracers. Thus, a 3D matrix of barcoded labelling can be utilized for the fluorescent COF tracers. In some embodiments, a drilled well is tagged at specific depth intervals with the injection of tags having one or more of a unique structure, fluorescence emission wavelength, or color. Thus, cuttings produced from each depth interval that are tagged with tags having the unique structure, fluorescence emission wavelength, and/or color can be identified. In some embodiments, identification of the tags allows for assignment of the depth of origin of the drill cuttings. In some embodiments, the depth interval that is tagged is about 50 meters.

In some embodiments, the fluorescent barcoded COF tracers are able to change the fluorescent response or structure or composition of the included guest molecules upon exposure to the reservoir (well) environment and thus to indicate specific parameters of the downhole environment such as the presence of sour gases, detection of hydrocarbons, or indication of specific minerals. Thus, also provided in the present disclosure are methods of detecting the presence of sour gases, hydrocarbons, and/or detecting and identifying specific minerals within the well.

Thus, provided in the present disclosure is a method of well logging. In some embodiments, the method includes adding a fluorescent covalent organic framework (COF) tracer to the well while drilling the well; injecting the fluorescent COF tracer into drill cuttings produced while drilling the well, thereby labeling the drill cuttings with the fluorescent COF tracer; pumping the labeled drill cuttings upwards in the well towards an annulus of the well; collecting the labeled drill cuttings; and identifying the fluorescent COF tracer in the drill cuttings. In some embodiments of the method, the fluorescent COF tracer is added to the well via a drill string of the well. In some embodiments, the well is an oil well.

In some embodiments, the fluorescent COF tracer is a fluorescent COF tracer as described in the present disclosure. In some embodiments, the fluorescent COF tracer contains fluorescent building blocks, covalently attached fluorescent moieties, fluorophores loaded into the channels and pores of the COF, or a combination thereof. In some embodiments, the fluorescent COF tracer contains fluorescent building blocks. In some embodiments, the fluorescent COF tracer contains covalently attached fluorescent moieties, such as fluorescent moieties covalently attached by post-synthetic modification of a non-fluorescent COF. In some embodiments, the fluorescent COF tracer contains fluorophores loaded into the channels and pores of the COF, such as a non-fluorescent COF.

In some embodiments, the fluorescent COF tracer is injected into the produced drill cuttings by breaking a capsule containing the fluorescent COF tracer, thereby labeling the drill cuttings with the fluorescent COF tracer. In some embodiments, the capsule contains the fluorescent COF tracer within a solution.

In some embodiments of the method, one or more than one fluorescent COF tracer is added to the well. In some embodiments, when more than one fluorescent COF tracer is added to the well, each fluorescent COF tracer has a different fluorescent emission wavelength and fluorescent emission spectra. In some embodiments, each fluorescent COF tracer is added simultaneously (at the same time) to the well. In some embodiments, each fluorescent COF tracer is added separately to the well.

In some embodiments, the labeled drill cuttings are comprised in a drilling mud which is pumped upwards by hydraulic circulation. In some embodiments, the method also includes separating the labeled drill cuttings from the drilling mud after collecting the labeled drill cuttings. In some embodiments, the labeled drill cuttings are collected at a shale shaker. In some embodiments, the shale shaker is located on-site.

In some embodiments of the method, the fluorescent COF tracer in the drill cuttings is identified by ultraviolet (UV) light and a camera. In some embodiments, the method includes determining a depth associated with the labeled drill cuttings based on the identification of the fluorescent COF tracer.

Also provided in the present disclosure is a method of determining the depth of drill cuttings in a well. In some embodiments, the method includes obtaining drill cuttings from the well, where the drill cuttings are labeled with a fluorescent COF tracer. The method further includes identifying the fluorescent COF tracer in the drill cuttings by ultraviolet (UV) light and a camera. In some embodiments, the fluorescent COF tracer has a fluorescent emission wavelength and fluorescent emission spectra that allows for determination of the depth associated with the labeled drill cuttings. In some embodiments, the identification of the fluorescent COF tracer occurs after collecting the drill cuttings. In some embodiments, the drill cuttings are collected a shale shaker. In some embodiments, the shale shaker is on-site at the well.

In some embodiments of the method, more than one fluorescent COF tracer is added to the well, where each fluorescent COF tracer has a different fluorescent emission wavelength and fluorescent emission spectra. In some embodiments, the drill cuttings are labeled with the fluorescent COF tracer downhole while drilling the well. In some embodiments, the fluorescent COF tracer is injected into the drill cuttings by breaking a capsule that contains the fluorescent COF tracer.

Also provided in the present disclosure is a method of detecting drill cuttings using fluorescence. In some embodiments, the drill cuttings are labeled with a fluorescent COF tracer. In some embodiments, the detecting is done on-site at the well. In some embodiments of the method, the fluorescent COF tracer in the drill cuttings is detected and identified by ultraviolet (UV) light and a camera. In some embodiments, the method includes determining a depth associated with the labeled drill cuttings based on the identification of the fluorescent COF tracer.

Also provided in the present disclosure is a composition containing drill cuttings obtained from a drilling well and one or more fluorescent COF tracers attached to the drill cuttings. In some embodiments, the fluorescent COF tracer is a fluorescent COF tracer as described in the present disclosure. In some embodiments, the fluorescent COF tracer contains fluorescent building blocks, covalently attached fluorescent moieties, fluorophores loaded into the channels and pores of the COF, or a combination thereof. In some embodiments, the fluorescent COF tracer contains fluorescent building blocks. In some embodiments, the fluorescent COF tracer contains covalently attached fluorescent moieties, such as fluorescent moieties covalently attached by post-synthetic modification of a non-fluorescent COF. In some embodiments, the fluorescent COF tracer contains fluorophores loaded into the channels and pores of the COF, such as a non-fluorescent COF. In some embodiments, the fluorescent COF tracer is detectable by ultraviolet (UV) spectroscopy.

EXAMPLES

Example 1—Synthesis of a Fluorescent COF

Figure 4:
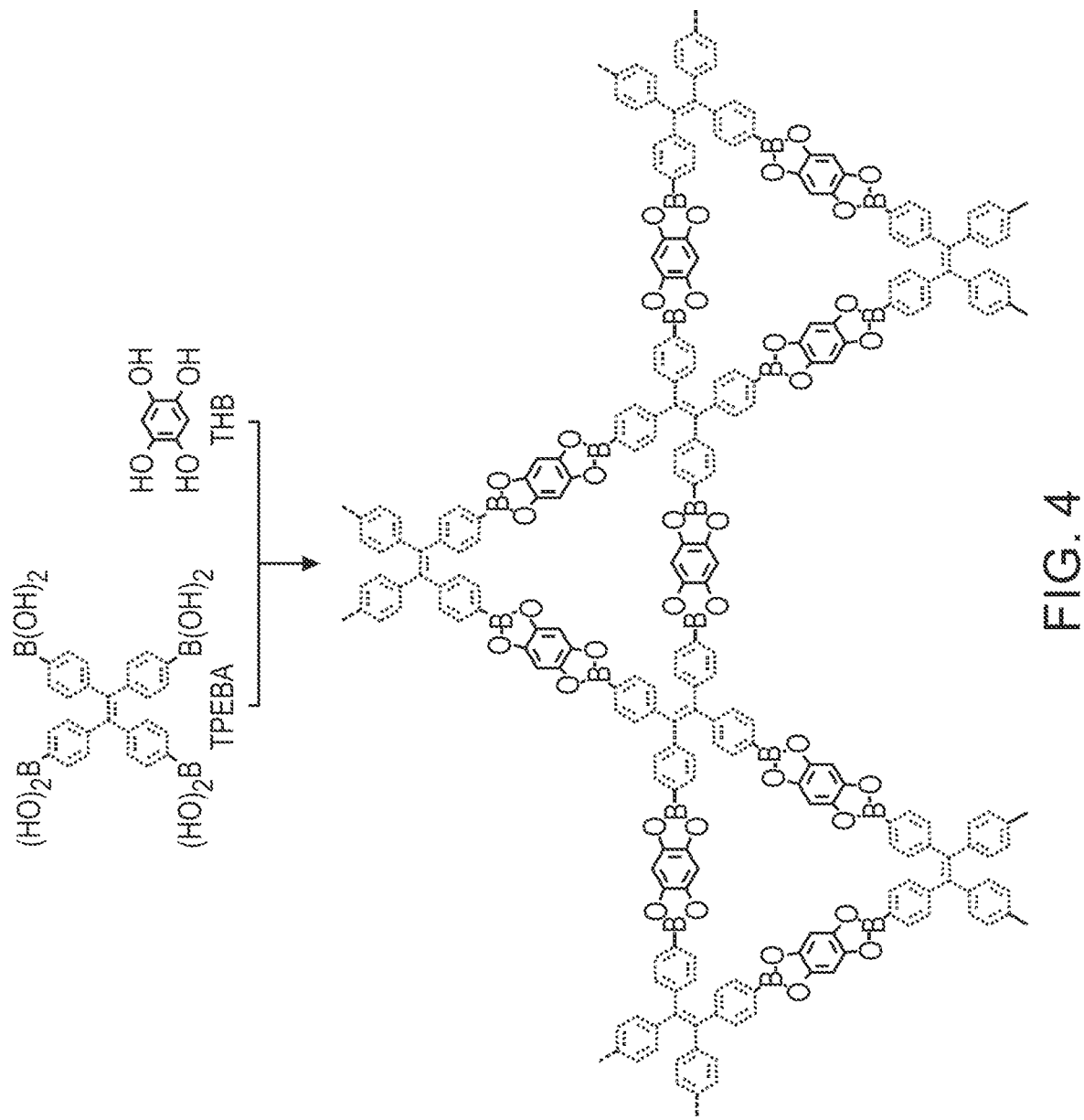
FIG. 4 shows an exemplary synthetic procedure for a fluorescent COF.

An exemplary fluorescent COF (TPE-Ph COF) can be synthesized according to the procedure described in Dalapati et al., J. Am. Chem. Soc. (2016) 138:5797-5800 and shown in FIG. 4. Briefly, the reaction is performed as a solvothermal condensation of tetraphenylethylene tetraboronic acid (TPEBA) and 1,2,4,5-tetrahydroxybenzene (THB) in a mixture of dioxane/mesitylene (1/1 by vol.) at 90° C. for three days. The product is obtained as a light yellow crystallite in 71% isolated yield.

Example 2—Detection and High Precision Identification of Fluorescent COF Tags Primary detection and identification of fluorescent COF tags can be done at the field and is based on the tags' fluorescent response. The detection can be carried out at the shale shaker using a UV light-equipped camera and an AI-based camera recognition system.

The precise laboratory identification of fluorescent COF tags can be further performed with extraction and utilization of further analytical methods, including fluorimetry, FTIR, PXRD, XRF, NMR, GC- or LCMS, and mass-spectroscopy. Presence of specific functional groups in COF frameworks can be detected with FTIR. Specific patterns of the crystal structure can be detected with PXRD and XRF. NMR can be utilized for detection of unique chemical structure of the organic frameworks. Mass-spectroscopy or combination of chromatography and mass-spectroscopy will provide data on molecular weight of frameworks' building blocks and/or guest molecules. The specific fluorescent emission wavelength can be recorded and estimated via fluorimetry.

These analytical methods would provide data unique for each of the selected COF tracers and each type of tracer would be characterized with unique fluorescent emission wavelength and fluorescent emission spectra.

In addition to the fluorescent response, the crystal structure of the fluorescent COF tagging material could be utilized as the second unique parameter for the identification of the labels. Powder X-ray diffraction analysis could be used for this purpose. PXRD patterns of tags would be unique for each crystal structure of each type of tracer. Additionally, mass-spectrometry will provide mass spectra of building blocks constructing each type of COF tag. Mass spectra of building blocks would provide another unique and specific parameter for these tracers.

Example 3—Drill Cuttings Labeling

A fluorescent COF tracer could be used for drill cuttings labeling and well logging according to the depth. The fluorescent tracers would be transported via the drill string into the well and face formation at the drill bit site. The fluorescent tracers would be injected into the formed drill cuttings by breaking capsules with encapsulated tags or tags solution upon drilling. Hydraulic circulation of the drilling mud would pump the generated cuttings with fluorescent tags upwards towards the annulus. The drilling cuts with fluorescent tracers would travel upwards to the shale shaker. Then at the shaker site, the drilling cuts bearing fluorescent tags would be separated of mud and the color of the tracer would be detected in UV light with a camera as illustrated in FIG. 5.

Example 4—Programmable Barcoding

The unique properties of the fluorescent COF tags could be used to program sequenced release of the tracers and thus to barcode the labelling parameters (depth of cuttings). The injection of the fluorescent tags can be programmed according to the sequence of the color of the tags' fluorescent response or color of the fluorescent response/PXRD pattern of the material or combinations of the color of fluorescent response/PXRD patterns/molecular mass of building blocks and particle size and shapes for unique barcoding the labelling parameters. Thus, 3D-matrix of barcoded labelling can be utilized for the tagging materials.

For example, for the programmed sequenced release of the fluorescent COF tags at each depth interval, every 50 meters of the drilled well would be tagged with the injection of one batch of the tags with the unique structure, fluorescence emission wavelength, and color. Thus, cuttings that are produced from 100 m to 150 m depth will be tagged with tags of a single color, for example, with the blue tags; the cuttings that are produced at the depth of 151 m to 200 m would be tagged with tags of a second color, for example, with red tags, and so on. Knowing the injection sequence of the tags by their unique color and structure programmed for each depth interval, one can assign the drill cuttings depth of origin according to the color of tag on the cuts upon the cuttings return to the shale shaker. If uncertainties would occur in determination of tags' color or detailed assessment of the tag would be required, the tags could be further analyzed at the lab with PXRD, FTIR, GC/LC-MS, or any other analysis to provide unique chemical composition of the tag specific for each depth interval.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of well logging, the method comprising:
    adding a fluorescent covalent organic framework (COF) tracer to the well while drilling the well;
    injecting the fluorescent COF tracer into drill cuttings produced while drilling the well, thereby labeling the drill cuttings with the fluorescent COF tracer;
    pumping the labeled drill cuttings upwards in the well towards an annulus of the well;
    collecting the labeled drill cuttings; and
    identifying the fluorescent COF tracer in the drill cuttings.

2. The method of claim 1, wherein the fluorescent COF tracer comprises fluorescent building blocks, covalently attached fluorescent moieties, fluorophores loaded into the channels and pores of the COF, or a combination thereof.

3. The method of claim 1, wherein the fluorescent COF tracer is added to the well via a drill string of the well.

4. The method of claim 1, wherein the fluorescent COF tracer is injected into the produced drill cuttings by breaking a capsule comprising the fluorescent COF tracer.

5. The method of claim 1, wherein more than one fluorescent COF tracer is added to the well, and wherein each fluorescent COF tracer has a different fluorescent emission wavelength and fluorescent emission spectra.

6. The method of claim 1, wherein the labeled drill cuttings are comprised in a drilling mud.

7. The method of claim 6, wherein the drilling mud is pumped upwards by hydraulic circulation.

8. The method of claim 6, further comprising separating the labeled drill cuttings from the drilling mud after collecting the labeled drill cuttings.

9. The method of claim 1, wherein the labeled drill cuttings are collected at a shale shaker.

10. The method of claim 1, wherein the fluorescent COF tracer in the drill cuttings is identified by ultraviolet (UV) light and a camera.

11. The method of claim 1, further comprising determining a depth associated with the labeled drill cuttings based on the identification of the fluorescent COF tracer.

12. The method of claim 1, wherein the well is an oil well.

13. A method of determining the depth of drill cuttings in a well, the method comprising:
    obtaining drill cuttings from the well, wherein the drill cuttings are labeled with a fluorescent covalent organic framework (COF) tracer; and
    identifying the fluorescent COF tracer in the drill cuttings by ultraviolet (UV) light and a camera, wherein the fluorescent COF tracer has a fluorescent emission wavelength and fluorescent emission spectra that allows for determination of the depth associated with the labeled drill cuttings.

14. The method of claim 13, wherein more than one fluorescent COF tracer is added to the well, and wherein each fluorescent COF tracer has a different fluorescent emission wavelength and fluorescent emission spectra.

15. The method of claim 13, wherein the drill cuttings are labeled with the fluorescent COF tracer downhole while drilling the well.

16. The method of claim 15, wherein the fluorescent COF tracer is injected into the drill cuttings by breaking a capsule comprising the fluorescent COF tracer.

17. The method of claim 13, wherein the identifying occurs onsite at the well.

* * * * *